US011018516B2

(12) United States Patent
Cho et al.

(10) Patent No.: US 11,018,516 B2
(45) Date of Patent: May 25, 2021

(54) ELECTRONIC DEVICE FOR PROVIDING USER INTERFACE FOR TRANSMITTING OR RECEIVING POWER WIRELESSLY AND METHOD THEREFOR

(71) Applicant: Samsung Electronics Co., Ltd., Gyeonggi-do (KR)

(72) Inventors: Jinhoon Cho, Gyeonggi-do (KR); Hyejin Kang, Gyeonggi-do (KR); Kyunghui Oh, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/736,497

(22) Filed: Jan. 7, 2020

(65) Prior Publication Data

US 2020/0220367 A1 Jul. 9, 2020

(30) Foreign Application Priority Data

Jan. 7, 2019 (KR) .................... 10-2019-0001555

(51) Int. Cl.
*H04M 1/724* (2021.01)
*H02J 7/00* (2006.01)
(Continued)

(52) U.S. Cl.
CPC ........ *H02J 7/0048* (2020.01); *H02J 7/00032* (2020.01); *H02J 7/02* (2013.01);
(Continued)

(58) Field of Classification Search
CPC .... H04M 1/02; H04M 1/725; H04M 1/72519; H02J 7/00032; H02J 7/0048; H02J 50/10; H02J 7/02; H02J 7/0032; H04B 5/0037
See application file for complete search history.

(56) References Cited

U.S. PATENT DOCUMENTS 10,536,010 B2 * 1/2020 Lim .................. H02J 7/0021
2009/0221240 A1 * 9/2009 Zhang .................. H04B 5/00
455/68
(Continued)

FOREIGN PATENT DOCUMENTS

EP 2 597 747 5/2013

OTHER PUBLICATIONS

Anonymous: "How to Use Huawei Mate 20 Pro's Reverse Wireless Charging—Zendure", XP055697051, Dec. 5, 2018, 7 pages.
(Continued)

*Primary Examiner* — Thanh C Le
(74) *Attorney, Agent, or Firm* — The Farrell Law Firm, P.C.

(57) ABSTRACT

An electronic device includes a first battery; a coil; a communication circuit; a display; a memory; and at least one processor operably coupled to the first battery, the coil, the communication circuit, the display, and the memory. The memory may include multiple instructions configured to cause, while being executed, the at least processor to identify a first user input for activating a function of sharing power in the first battery; display a user interface (UI) indicating that the function has been activated on the display, based on the identification of the first user input; identify an external electronic device distinguished from the electronic device by using the communication circuit, while the UI is displayed; display a visual element indicating information regarding a second battery included in the identified external electronic device on the UI, based on the identification of the external electronic device; and output power in the first battery to the identified external electronic device through the coil, at least partially based on a second user input regarding the visual element.

20 Claims, 27 Drawing Sheets

(51) Int. Cl.
    H02J 50/10     (2016.01)
    H02J 7/02      (2016.01)
    H04B 5/00      (2006.01)
(52) U.S. Cl.
    CPC ............ *H02J 50/10* (2016.02); *H04B 5/0037* (2013.01); *H04M 1/724* (2021.01)

(56) References Cited

U.S. PATENT DOCUMENTS

2017/0063431 A1    3/2017   Milne et al.
2018/0123379 A1    5/2018   Ha et al.
2020/0251929 A1*   8/2020   Partovi .................. H02J 50/12
2020/0266674 A1*   8/2020   Lee ..................... H04B 5/0037

OTHER PUBLICATIONS

Anonymous: "We Tested the Wireless Reverse Charging on the Huawei Mate 20 Pro—Gizmodo Australia", XP055697059, Oct. 17, 2018, 14 pages.
European Search Report dated Jun. 3, 2020 issued in counterpart application No. 20150558.3-1203, 10 pages.
Reverse Wireless Charging With the Huawei Mate 20 Pro www.youtube.com/watch?v=ZtWT31OFrWc.
Huawei Mate 20 Pro Can Wirelessly Charge the Freebuds 2 Pro Wireless Earbuds www.xda-developers.com/huawei-mate-20-pro-wirelessly-charge-freebuds-2-pro-wireless-earbuds/.

* cited by examiner

ELECTRONIC DEVICE FOR PROVIDING USER INTERFACE FOR TRANSMITTING OR RECEIVING POWER WIRELESSLY AND METHOD THEREFOR

CROSS-REFERENCE TO RELATED APPLICATION(S)

This application is based on and claims priority under 35 U.S.C. § 119 to Korean Patent Application No. 10-2019-0001555, filed on Jan. 7, 2019, in the Korean Intellectual Property Office, the disclosure of which is incorporated by reference herein in its entirety.

BACKGROUND

1. Field

The present disclosure generally relates to an electronic device for providing a user interface for transmitting or receiving power wirelessly and a method therefor.

2. Description of Related Art

An electronic device such as a smartphone, a tablet personal computer, or a smart watch may include a power transceiver for acquiring power wirelessly or providing power wirelessly, for convenience. Such a power transceiver may acquire power through a coil or may provide power to an external electronic device.

When a user wirelessly transmits power in the electronic device to the external electronic device through the coil, the electronic device needs to consider various conditions regarding the wireless power transmission environment. The electronic device may require a scheme for allowing the user to adjust various parameters regarding the wireless power transmission environment.

SUMMARY

The present disclosure has been made to address the above-mentioned problems and disadvantages, and to provide at least the advantages described below.

In accordance with an aspect of the disclosure, an electronic device includes a first battery; a coil; a communication circuit; a display; a memory; and at least one processor operably coupled to the first battery, the coil, the communication circuit, the display, and the memory. The memory includes multiple instructions, and the multiple instructions are configured to cause, while being executed, the at least processor to identify a first user input for activating a function of sharing power in the first battery; display a user interface (UI) indicating that the function has been activated on the display, based on the identification of the first user input; identify an external electronic device distinguished from the electronic device by using the communication circuit, while the UI is displayed; display a visual element indicating information regarding a second battery included in the identified external electronic device on the UI, based on the identification of the external electronic device; and output power in the first battery to the identified external electronic device through the coil, at least partially based on a second user input regarding the visual element.

In accordance with another aspect of the disclosure, an electronic device includes a battery; a coil; a display; at least one sensor; a memory; and at least one processor operably coupled to the battery, the coil, the display, the at least one sensor, and the memory, wherein the memory is configured to store multiple instructions configured to cause, while being executed, the at least one processor to identify a user input for activating a function of sharing power in the battery based on the coil; measure first luminance of light directed to the at least one sensor in response to activation of the function based on the identified user input; identify a connection between the electronic device and an external electronic device for receiving power in the battery for a preset time after activation of the function; measure second luminance of light directed to the at least one sensor in response to identifying that the connection is not established in the present time; and deactivate the function of sharing power in the battery, at least partially based on the first luminance and the second luminance.

In accordance with another aspect of the disclosure, an electronic device includes a battery; a coil; a display; at least one sensor; a memory; and at least one processor operably coupled to the battery, the coil, the display, the at least one sensor, and the memory, wherein the memory is configured to store multiple instructions configured to cause, while being executed, the at least processor to identify a user input for activating a function of sharing power in the battery based on the coil; identify a connection between the electronic device and an external electronic device for receiving power in the battery for a preset time in response to activation of the function based on the identified user input; acquire data regarding a movement of the electronic device measured by using the at least one sensor for the preset time; identify the movement of the electronic device measured within the present time based on the data in response to identifying that the connection is not established in the preset time; and deactivate the function of sharing power in the battery in response to identifying the movement of the electronic device measured within the preset time.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
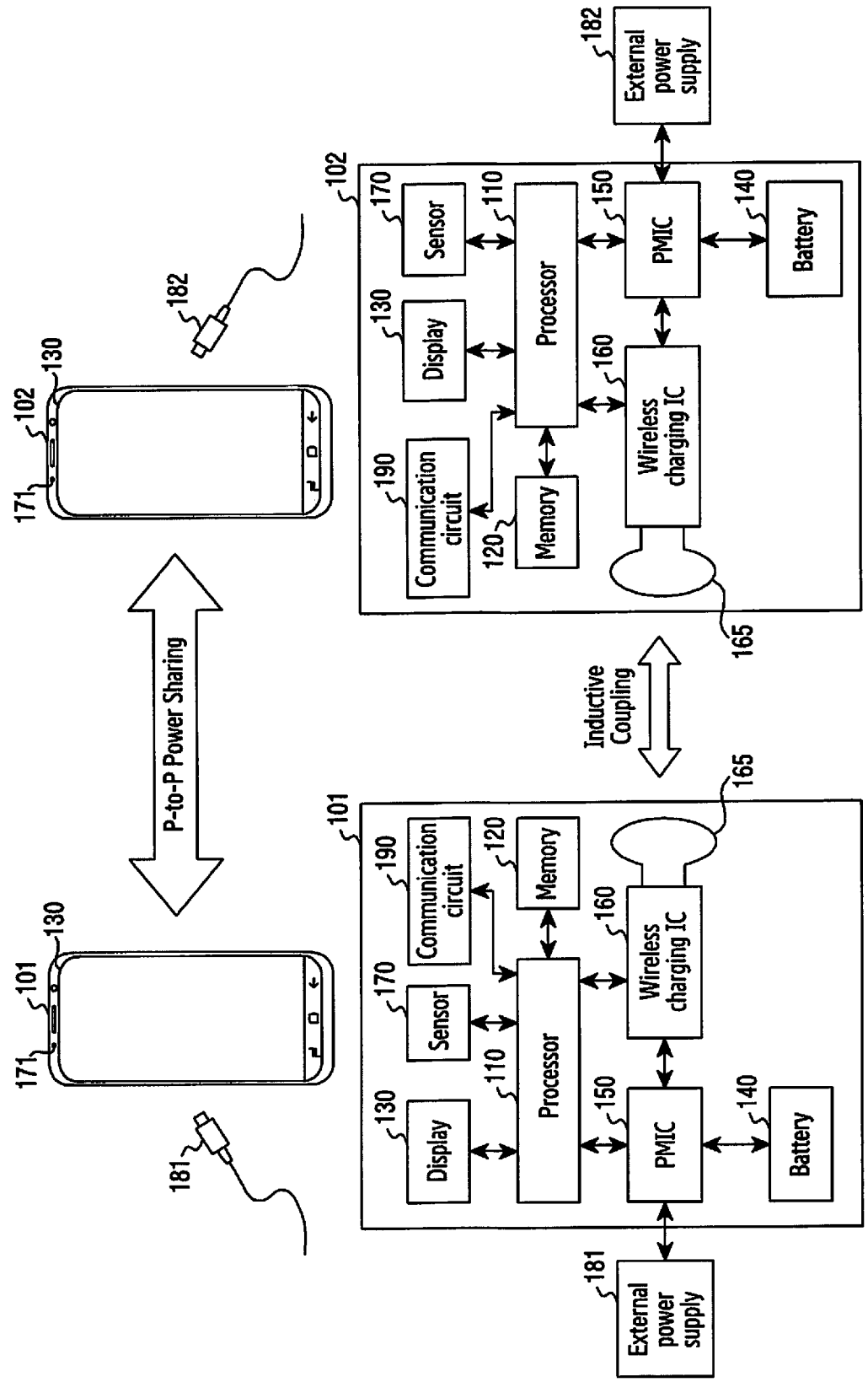
FIG. 1 is a block diagram illustrating a configuration of electronic devices, according to an embodiment.

An electronic device according to various embodiments may transmit power, when the user wants to wirelessly transmit power in the electronic device to the external electronic device through a coil based on various conditions regarding a wireless power transmission environment. The electronic device may enable the user to adjust various parameters regarding the wireless power transmission environment by using a UI provided to the user.

The present disclosure may have various embodiments, and modifications and changes may be made therein. Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

As used herein, the expression "have", "may have", "include", or "may include" refers to the existence of a corresponding feature (e.g., a numeral, a function, an operation, or a constituent element such as component), and does not exclude one or more additional features.

In the present disclosure, the expression "A or B", "at least one of A or B", "at least one of A and B", "one or more of A or B", or "one or more of A and B" may include all possible combinations of the items listed. For example, the expression "A or B", "at least one of A and B", or "at least one of A or B" includes at least one A, includes at least one B, or includes both at least one A and at least one B.

The expression "a first", "a second", "the first", or "the second" may modify various components regardless of order and/or importance but does not limit the corresponding components. For example, a first user device and a second user device indicate different user devices although both of them are user devices. A first element may be termed a second element, and similarly, a second element may be termed a first element without departing from the scope of the present disclosure.

It should be understood that when an element (e.g., a first element) is referred to as being operatively or communicatively "connected," or "coupled," to another element (e.g., a second element), it may be directly connected with or coupled directly to the other element or any other element (e.g., a third element) may be interposed between them. In contrast, it may be understood that when an element (e.g., a first element) is referred to as being "directly connected," or "directly coupled" to another element (e.g., a second element), there is no element (e.g., third element) interposed between them.

The expression "configured to" used in the present disclosure may be exchanged with, "suitable for", "having the capacity to", "designed to", "adapted to", "made to", or "capable of", according to the situation. The term "configured to" may not necessarily imply "specifically designed to" in hardware. Alternatively, in some situations, the expression "device configured to" may mean that the device, together with other devices or components, "is able to". For example, the phrase "processor adapted to perform A, B, and C" may mean a dedicated processor (e.g. an embedded processor) only for performing the corresponding operations or a generic-purpose processor (e.g., a central processing unit (CPU) or an application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even terms defined in the present disclosure should not be interpreted to exclude embodiments of the present disclosure.

An electronic device may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group (MPEG)-1 audio layer-3 (MP3) player, a mobile medical device, a camera, and a wearable device. The wearable device may include at least one of an accessory type device (e.g., a watch, a ring, a bracelet, an anklet, a necklace, glasses, a contact lens, or a head-mounted device (HMD)), a fabric or a clothing integrated type device (e.g., electronic clothing), a body-mounted type device (e.g., a skin pad or tattoo), and a bio-implantable type device (e.g., an implantable circuit).

The electronic device may be a home appliance. The home appliance may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™, an electronic dictionary, an electronic key, a camcorder, and an electronic photo frame.

The electronic device may include at least one of various medical devices (e.g., various portable medical measuring devices (blood glucose monitoring devices, heart rate monitoring devices, blood pressure measuring devices, or body temperature measuring devices), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic devices for a ship (e.g., a navigation device for a ship and a gyro-compass), an avionics device, security devices, an automotive head unit, a robot for home or industry, an automatic teller machine (ATM), a point of sales (POS) device, or an Internet of things (IoT) device (e.g., a light bulb, various sensors, electric or gas meters, a sprinkler device, a fire alarm, a thermostat, a streetlamp, a toaster, sporting goods, a hot water tank, a heater, or a boiler).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned devices. The electronic device may be a flexible device. Further, the electronic device is not limited to the aforementioned devices, and may include a new electronic device according to the development of technology.

Hereinafter, an electronic device will be described with reference to the accompanying drawings. As used herein, the term "user" may indicate a person who uses an electronic device or a device (e.g., an artificial intelligence electronic device) that uses an electronic device.

Hereinafter, various embodiments will be described in detail with reference to the accompanying drawings. The size of constituent elements may be exaggerated or reduced in the drawings for convenience of description. For example, the size and thickness of each constituent element illustrated in the drawings are determined arbitrarily for convenience of description, and the disclosure is not necessarily limited thereto.

FIG. 1 is a block diagram illustrating the configuration of electronic devices 101 and 102, according to an embodiment. The electronic devices 101 and 102 in FIG. 1 may correspond to at least one of a smartphone, a smart pad, a tablet PC, a PDA, a laptop PC, or a desktop PC. The electronic devices 101 and 102 may correspond to a wearable device including at least one of an accessory-type device, a fabric or garment-integrated device, a body-attached device, or a bio-implantable device. The electronic devices 101 and 102 may be home appliances such as refrigerators, TVs, cleaners, air conditioners, washing machines, and lighting devices.

The electronic devices 101 and 102 may include a processor 110, a memory 120, a display 130, a battery 140, a power management integrated circuit (PMIC) 150, a wireless charging integrated circuit (IC) 160, a coil 165, a sensor module 170, a communication circuit 190, or a combination thereof. The above-described hardware components may be electrically and/or operably coupled to each other through a communication interface. The at least one hardware component included in the electronic devices 101 and 102 may operate by means of electric power output based on energy conversion between chemical energy and electrical energy inside the battery 140. The following description will be made with reference to the electronic 101 assuming that the electronic device 102 is an external electronic device, and the electronic device 102 may include the same hardware components as those of the electronic device 101 and may operate similarly to the electronic device 101.

The processor 110 may execute at least one instruction stored in the memory 120. The number of processors 110 included in the electronic device 101 is not limited to that illustrated in FIG. 1, and an electronic device 101 may include multiple processors. The processor 120 may include a circuit for processing data, for example, at least one of an integrated circuit (IC), an arithmetic logic unit (ALU), a field programmable gate array (FPGA), and a large scale integration (LSI).

The memory 120 may store data regarding the electronic device 101. The memory 130 may include a volatile memory such as a random access memory (RAM), including a static random access memory (SRAM) or a dynamic RAM (DRAM), or may include a nonvolatile memory such as a read only memory (ROM), a magnetoresistive RAM (MRAM), a spin-transfer torque MRAM (STT-MRAM), a phase-change RAM (PRAM), a resistive RAM (RRAM), a ferroelectric RAM (FeRAM), a flash memory, an embedded multimedia card (eMMC), or a solid state drive (SSD).

The memory 120 may store an instruction regarding an application and an instruction regarding an operating system (OS). The OS is system software executed by the processor 110. By executing the OS, the processor 110 may manage hardware components included in the electronic device 101. The OS may provide an application programming interface (API) with an application corresponding to software other than the system software. At least one application, which is a set of multiple instructions, may be installed in the memory 120. The fact that an application is installed in the memory 120 means that the application is stored in such a format that the same can be executed by the processor 110 connected to the memory 120.

The display 130 may visually output information to the user through a display based on at least one of organic light-emitting diodes (OLED), a liquid crystal display (LCD), and light-emitting diodes (LED). The electronic device 101 may include a touch screen panel (TSP) disposed on the display 130 such that a user interface (UI) output through the display 130 can be controlled more intuitively. The TSP may detect the position of an object (for example, the user's finger or a stylus) touching the display 130 or hovering above the display 130 by using at least one of a resistive film, capacitive components, surface acoustic waves, and infrared waves.

The sensor 170 may generate an electric signal based on the state of the electronic device 101 and/or the state of the space including the electronic device 101. The generated electric signal may be transmitted to the processor 110. The number of sensors 170 included in the electronic device 101 may be greater than or to one. For example, the sensors 170 may include a motion sensor for measuring the movement of the electronic device 101, a luminance sensor 171 for measuring the luminance of light directed to the electronic device 101, and/or a temperature sensor provided adjacent to the battery 140 so as to measure the temperature of the battery 140. The motion sensor may correspond to at least one of an acceleration sensor, a gyro sensor, and/or a gravity sensor for measuring the movement of the electronic device 101 in terms of the acceleration, the angular acceleration, and/or the gravity. Referring to FIG. 1, the luminance sensor 171 may be disposed on the first surface of the housing of the electronic device 101, on which the display 130 is disposed, so as to measure the luminance of light directed to the first surface.

The communication circuit 190 may connect the electronic device 101 to another electronic device (for example, electronic device 102) and/or a network base on a wireless network, such as Bluetooth, wireless fidelity (Wi-Fi), near field communication (NFC), or long term evolution (LTE), and a wired network such as a local area network (LAN) or Ethernet. The communication circuit 190 may include at least one of a communication circuit supporting a wireless network or a wired network, a communication processor (CP), and a communication interface. The electronic device 101 may be simultaneously connected to multiple electronic devices through the communication circuit 190, and may respectively perform functions distinguished with regard to the multiple electronic devices. For example, the electronic device 101 may be simultaneously connected to the electronic device 102, a Bluetooth headset, and an earphone through the communication circuit 190. In this case, the electronic device 101 may enable telephone speech through the earphone while wirelessly charging the electronic device 102.

The battery 140 may refer to a battery cell, a battery module, or a battery pack. The battery 140 may include a rechargeable battery configured to store power through charging, or a secondary battery. The battery 140 may be one of a Lithium-ion (Li-ion) battery, an Li-ion polymer battery, a lead rechargeable battery, a nickel-cadmium (Ni—Cd) battery, and a nickel metal hydride (NiMH) rechargeable battery. The battery 140 may be charged when the magnitude of current input to the battery 140 is larger than the magnitude of current output from the battery 140. The battery 140 may be discharged when the magnitude of current output from the battery 140 is larger than the magnitude of current input to the battery 140.

The PMIC 150 may be disposed between the battery 140 and at least one hardware component included in the electronic device 101 so as to control the flow of current output from the battery 140 and/or current input toward the battery 140. For example, on a printed circuit board (PCB) on which at least one hardware component included in the electronic device 101 is disposed, the PMIC 150 may be disposed adjacent to a port that connects the battery 140 and a communication interface on the PCB. In order to control the flow of current, the PMIC 150 may include a linear regulator or a switching regulator. The PMIC 150 may include an application-specific integrated circuit (ASIC) for managing at least one piece of information regarding the battery 140.

At least one piece of information regarding the battery 140 may include the state of charge (SoC) of the battery 140, the state of health (SoH) thereof, the charging cycle, the discharging cycle, the temperature, the capacity, or a combination thereof. The at least one piece of information regarding the battery 140 may be associated with the condition to perform charging of the battery 140. The current input to the battery 140 (for example, a charging current used to charge the battery 140) may be variously expressed by using a unit such as amperage (A) or milli(m)-A. Alternatively, the charging current may be expressed in terms of Coulomb's (C)-rate. The C-rate refers to battery-related characteristics indicating the current charging/discharging rate according to the battery capacity, and is normally expressed by using the unit of "C". For example, when the battery capacity corresponding to the amount of current that can be used for one hour is 1000 mAh, and when the charging/discharging current is 1 A, the C-rate is 1 C=1 A/1000 mAh.

The SoC is a parameter indicating to what extent the battery 140 is charged. The SoC may indicate the degree of energy stored in the battery 140, and may be expressed, by using the unit percentage (%), as a value between 0-100%. For example, 0% may correspond to a fully discharged state, and 100% may correspond to a fully charged state. The manner of expressing the SoC may be variously modified and defined according to the design intent or the embodiment. The PMIC 150 may estimate or measure the SoC based on various techniques. For example, the PMIC 150 may determine the SoC based on the voltage between the positive and negative electrodes of the battery 140 and/or the open circuit voltage (OCV) of the battery 140.

The SoH is a figure of merit of the battery 140, and is a parameter indicating the performance of the battery 140 in the current condition compared with the performance of the battery 140 in an ideal condition. The SoH may quantitatively indicate the health characteristics change of the battery 140 resulting from the aging effect (degradation phenomenon) occurring in the battery 140. The SoH may be expressed, by using the unit of percentage (%), as a value between 0-100%. For example, when the performance of the battery 140 in the current condition is identical to the performance of the battery 140 in the ideal condition (for example, the condition of the battery 140 at the moment of completion of production of the battery 140), the SoH of the battery 140 may be expressed as 100%. The SoH may gradually decrease as the battery 140 is used while being charged or discharged. The SoH may be used as a reference indicating the degree of degradation of the health or capacitance of the battery. The capacitance of the battery 140 may be expressed by an ampere hour (Ah) unit indicating the time for which a preset magnitude of current can be output.

Referring to FIG. 1, the PMIC 150 may be connected to a wireless charging IC 160 associated with wireless charging of the battery 140. The wireless charging IC 160 may be connected to the coil 165. The wireless charging IC 160 may transmit a current induced in the coil 165 by an electromagnetic field in a space adjacent to the coil 165, to the PMIC 150. The wireless charging IC 165 may input a current received from the battery 140 to the coil 165, thereby generating an electromagnetic field in the space adjacent to the coil 165. The generated electromagnetic field may be used to charge the battery included in the external electronic device (for example, the battery 140 of the electronic device 102 in FIG. 1), based on the power in the battery 140. The coil 165 may be disposed on the second surface distinguished from the first surface of the housing of the electronic device 101, on which the display 130 is disposed. For example, the second surface and the first surface may be opposite to each other.

The coil 165 may be helically formed on a flexible PCB (FPCB). The wireless charging IC 160 may include a full bridge circuit. While power is received wirelessly through the coil 165, the wireless charging IC 160 may control the full bridge circuit to be driven as an inverter. In the full bridge circuit driven as an inverter, an alternating current induced in the coil 165 may be changed to a direct current. While power is transmitted wirelessly through the coil 165, the wireless charging IC 160 may control the full bridge circuit to be driven as a rectifier. In the full bridge circuit driven as a rectifier, a direct current acquired from the battery 140 may be changed to an alternating current. As the changed alternating current is input to the coil 165, an electromagnetic field may be generated in the space adjacent to the coil 165.

The wireless charging IC 160 may exchange information necessary for wireless power transmission with the electronic device 102 through in-band communication according to at least a part of the Wireless Power Consortium (WPC) standard (or nonstandard). For example, the in-band communication may be a scheme enabling data exchange between the electronic device 101 and the electronic device 102 through modulation of the frequency and/or amplitude of a wireless power transmission signal during wireless power transmission between the coil 140 of the electronic device 101 and the coil 140 of the electronic device 102. Communication between the electronic device 101 and the electronic device 102 may be out-of-band communication. For example, the out-of-band communication may be short-distance communication based on a frequency different from that of a wireless power signal, such as NFC, Bluetooth, or Wi-Fi. The out-of-band communication may be performed based on the communication circuit 190.

The PMIC 150 may perform a charging function of charging the battery 140 by wired and wireless input power, a function of communicating (for example, via universal serial bus (USB) battery charging specification, via USB power delivery (PD) communication, via automatic frequency control (AFC) communication, and/or via quick charge (QC) communication) with an external power supply (for example, a travel adapter) connected to a USB terminal, a function of supplying necessary power to the system and supplying each element with power at a necessary voltage level, and/or a function of supplying power to the wireless charging IC 160 in a wireless power transmission mode.

The external connecting terminals 181 and 182 may be terminals following USB standards. For example, the external connecting terminals 181 and 182 may be interfaces for USB charging and/or on-the-go (OTG) power supply. The external connecting terminals 181 and 182 may be connected to an external power supply source (a travel adapter (TA) or a battery pack).

The processor 110 may integrally control the functions of the battery 140 for wired/wireless charging and USB communication with the electronic device 102 and/or communication (for example, via USB PD, via battery charging (BC)1.2, via AFC, and/or via QC) with the electronic device 102 according to the situation of the electronic device 101. For example, BC1.2 or PD may be an interface for communicating with an external power supply source (i.e., a TA), and the processor 110 may control communication with the external power supply source. For example, the electronic device 101 may obtain the temperature of the electronic device 101 and/or the capacity of the battery 140 of the electronic device 101.

The electronic device 101 may operate based on a mode for wirelessly transmitting power in the battery 140 to an external electronic device, such as the electronic device 102 (wireless power transmission mode). Alternatively, when a wired power supply device is connected to the electronic device 101, the electronic device 101 may operate in the wireless power transmission mode by using externally supplied power. For example, when a wired power supply device is connected, the electronic device 101 may preferentially transmit power acquired from the wired power supply device to the external electronic device, and may use the remaining power to charge the battery 140. For example, the processor 110 and/or the PMIC 150 of the electronic device 101 may input power acquired from the wired power supply device to the wireless charging IC 160, and may input the remaining power to the battery 140.

The electronic device 101 may output a user interface (UI) associated with the wireless power transmission mode inside the display 130 based on a user input associated with the wireless power transmission mode. The user of the electronic device 101 may wirelessly transmit and/or share power in the battery 140 of the electronic device 101 to/with the battery 140 of the electronic device 102, based on the UI.

Figure 2:
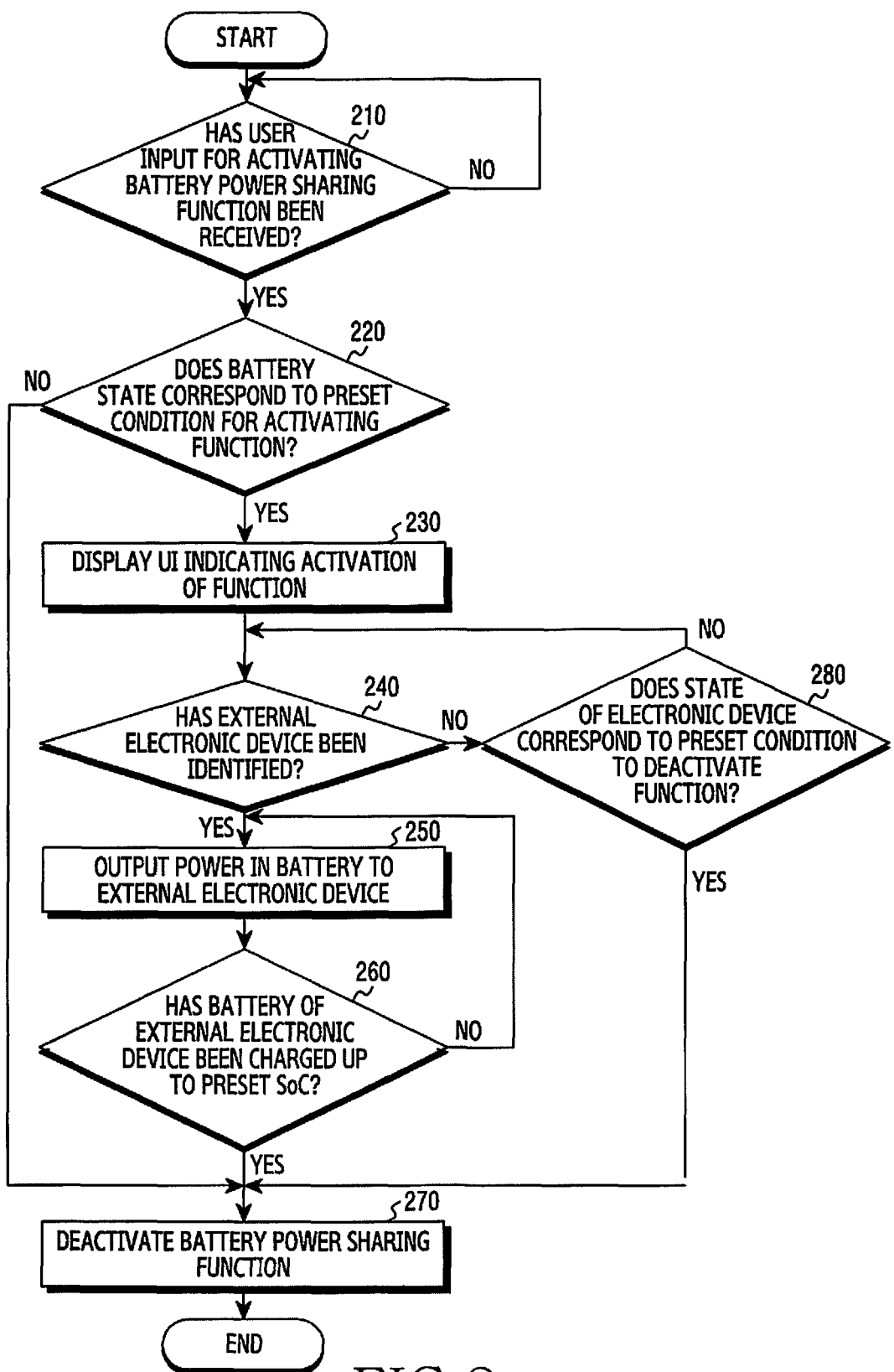
FIG. 2 is a flowchart illustrating operations of an electronic device, according to an embodiment.

FIG. 2 is a flowchart 200 illustrating operations of an electronic device, according to an embodiment. The electronic device in FIG. 2 may correspond to the electronic device 101 in FIG. 1. The operations in FIG. 2 may be performed based on the electronic device 101, the processor 110, and/or the PMIC 150 in FIG. 1.

Referring to FIG. 2, in step 210, the electronic device receives or identifies a user input for activating a battery power sharing function. The function may be associated with a wireless power transmission mode. The user input may be identified through a UI displayed inside the display of the electronic device. Operations of the user of the electronic device activating the battery power sharing function based on the UI displayed inside the display will be described in detail with reference to FIGS. 3A-3C.

The user may activate the battery power sharing function not only based on the UI displayed inside the display, but also based on a button visible to the outside through the housing of the electronic device and/or a voice input. The user may connect (for example, pair) an external electronic device (for example, the electronic device 102 in FIG. 1) to the electronic device. In this case, the electronic device may receive a request for activation of the battery power sharing function from the external electronic device.

In response to receiving a user input for activating the battery power sharing function, the electronic device determines, in step 220, whether or not the state of the battery corresponds to a preset condition for activating the function. The electronic device may determine whether or not to activate the wireless power transmission mode. The condition may be associated with the SoC of the battery, the temperature of the battery, the power consumed by the electronic device, and/or the type of the external electronic device connected to the electronic device independently of the step 210. For example, if the SoC of the battery is not sufficient to charge the external electronic device while maintaining the operation of the electronic device, or if the temperature of the battery is expected to excessively increase as the current output from the battery increases, the electronic device may determine that power in the battery cannot be shared in the current state. Operations of the electronic device activating the wireless power transmission mode, based on step 220, will be described in detail with reference to FIGS. 4-5.

If the state of the battery corresponds to the preset condition for activating the function, the electronic device displays, in step 230, a UI indicating that the function has been activated. The UI may include information that guides operations to be performed by the user in order to wirelessly share power in the battery. The operations to be performed by the user may include, for example, an operation of disposing the electronic device and the external electronic device in preset postures.

The UI may include at least one visual element displayed on the display, such as a text, an image, an animation, a video, and/or an icon. Based on the UI, the electronic device may visually output the information through the display, may auditorily output the information through the speaker, or may output the information in a haptic format through a hardware component such as a vibration motor. The UI displayed inside the display by the electronic device based on step 230 will be described in detail with reference to FIGS. 6A-6C.

After displaying the UI, the electronic device determines whether an external electronic device is identified in step 240. While displaying the UI, the electronic device may identify an external electronic device distinguished from the electronic device by using the communication circuit communication circuit 190. The electronic device may identify an external electronic device based on a short-distance communication scheme such as Bluetooth and/or NFC. The electronic device may identify an external electronic device based on in-band communication using the wireless charging IC 160 and/or the coil 165 in FIG. 1. Identification of an external electronic device by the electronic device may be performed for a preset time after activating the battery power sharing function and/or the wireless power transmission mode. The preset time may be designated by the user of the electronic device or may be heuristically designated.

If no external electronic device is identified in step 240, the electronic device determines, in step 280, whether or not the state of the electronic device corresponds to a preset condition for deactivating the function. For example, if no external electronic device has been identified for the preset time after activating the battery power sharing function and/or the wireless power transmission mode, the electronic device may determine whether or not to deactivate the function and/or the wireless power transmission mode.

The preset condition may be associated with whether or not the user of the electronic device is maintaining the electronic device in a state that facilitates wireless power output. For example, if the user has laid down the electronic device in FIG. 1 such that a surface thereof on which the coil 165 is disposed is viewable from the outside, the electronic device may determine that the user is maintaining the electronic device in a state that facilitates wireless power output. Deactivating the battery power sharing function and/or the wireless power transmission function, based on step 270, will be described in detail with reference to FIG. 14 and FIG. 15.

In response to identification of an external electronic device in step 240, the electronic device outputs power in the battery to the external electronic device in step 250. For example, the electronic device may identify an external electronic device within the present time after activating the battery power sharing function and/or the wireless power transmission mode. Referring to FIG. 1, in response to identification of the electronic device 102, the electronic device 101 may output power in the battery 140 to the coil 165 of the electronic device 102 based on the wireless charging IC 160 and/or the coil 165. The electronic device 102 may use the power received through the coil 165 to charge the battery 140.

In response to identification of an external electronic device, the electronic device displays a visual element indicating information regarding the battery included in the identified external electronic device inside the UI that was displayed in step 230. For example, the information and/or the visual element may indicate the current SoC of the battery included in the external electronic device and/or a target SoC. The target SoC may be associated with the timepoint and/or the state at which the charging of the battery of the external electronic device is suspended based on the battery power sharing function of the electronic device. If the user changes the target SoC based on the visual element displayed on the UI, the electronic device may output power in the battery to the external electronic device based on the changed target SoC. The UI displayed by the electronic device in response to identification of the external electronic device will be described in detail with reference to FIGS. 8A-8C and FIG. 10.

Identifying an external electronic device in step 240 may mean identifying a connection between the external electronic device and the electronic device. The connection may means wireless connection based on the communication circuit 190 in FIG. 1. In response to identifying the connection between the external electronic device and the electronic device established by using the communication circuit within a preset time, the electronic device may identify whether or not the battery power sharing function and/or the wireless power transmission mode have been activated in the external electronic device. When the battery power sharing function and/or the wireless power transmission mode has been activated in the external electronic device, the electronic device may request the external electronic device to deactivate the function of sharing power in the battery of the external electronic device by using the communication circuit. In response to identifying that the external electronic device has deactivated the battery power sharing function and/or the wireless power transmission mode, the electronic device may initiate outputting power in the battery to the external electronic device through the coil based on step 250.

After outputting power in the battery to the external electronic device, the electronic device determines, in step 260, whether or not the battery of the external electronic device is charged up to a preset SoC. The present SoC may be displayed inside the UI that is displayed in step 230. The preset SoC may correspond to the target SoC. The electronic device may identify the SoC of the battery of the external electronic device based on a wireless connection established between the external electronic device and the electronic device and/or in-band communication using the coil 165 in FIG. 1. When the identified SoC is below the present SoC, the electronic device may keep outputting power in the battery to the external electronic device based on step 250.

While outputting power in the battery to the external electronic device, the electronic device may determine whether or not to maintain the battery power outputting state based not only on the SoC of the battery of the external electronic device, but also on various states of the electronic device and/or the external electronic device. The operation of the electronic device determining whether or not to suspend charging of the battery of the external electronic device based on various states will be described in detail with reference to FIG. 9.

When the battery of the external electronic device has been charged up to the present SoC, the electronic device deactivates the battery power sharing function in step 270. For example, in response to identifying a SoC greater than or equal to the present SoC from the external electronic device, the electronic device may suspend outputting power in the battery to the external electronic device. The processor 110 and/or the PMIC 150 in FIG. 1 may suspend inputting power in the battery 140 to the wireless charging IC 160. The electronic device may notify the external electronic device of deactivation of the battery power sharing function and/or the wireless power transmission mode, based on wireless connection established between the electronic device and the external electronic device by using the communication circuit and/or the in-band communication using the coil. In response to deactivation of the battery power sharing function and/or the wireless power transmission mode, the electronic device may change the display of the UI that is displayed in step 230.

Referring to FIG. 2, the electronic device provides a UI that enables the user to change at least one parameter associated with the battery power sharing function and/or the wireless power transmission mode. The electronic device may charge the battery of the external electronic device in a limited environment, based on various states of the external electronic device and/or the electronic device.

Figure 3A:
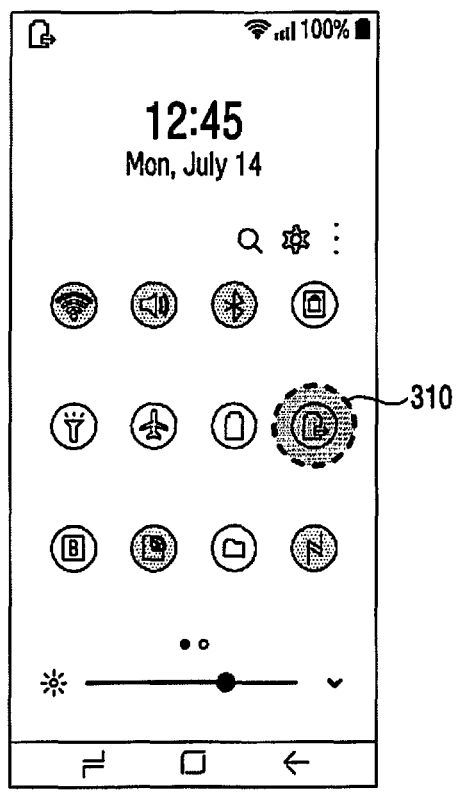
FIG. 3A is a diagram illustrating an electronic device identifying a user input for activating a battery power sharing function, according to an embodiment.
Figure 3B:
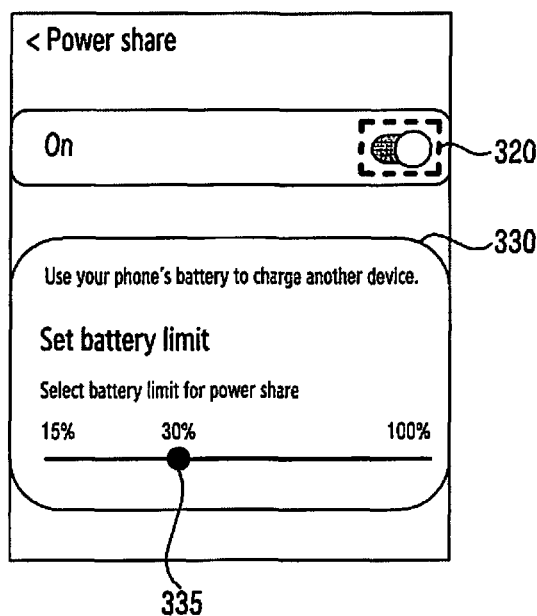
FIG. 3B is a diagram illustrating an electronic device identifying a user input for activating a battery power sharing function, according to an embodiment.
Figure 3C:
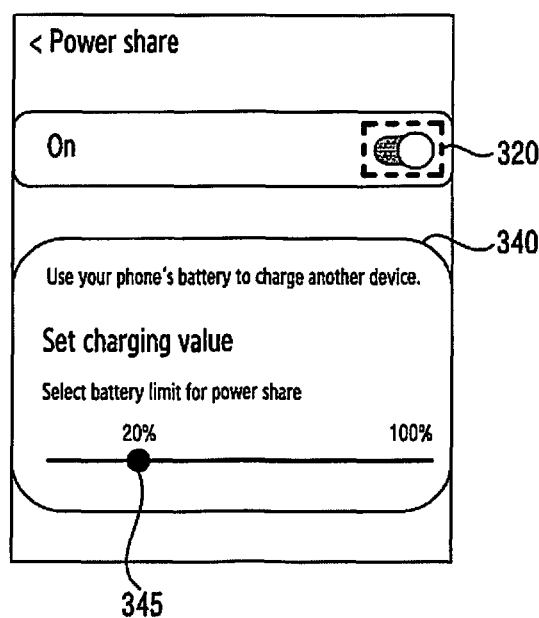
FIG. 3C is a diagram illustrating an electronic device identifying a user input for activating a battery power sharing function, according to an embodiment.

FIG. 3A is a diagram illustrating an electronic device identifying a user input for activating a battery power sharing function, according to an embodiment. FIG. 3B is a diagram illustrating an electronic device identifying a user input for activating a battery power sharing function, according to an embodiment. FIG. 3C is a diagram illustrating an electronic device identifying a user input for activating a battery power sharing function, according to an embodiment. The electronic device in FIGS. 3A-3C may correspond to the electronic device 101 in FIG. 1. The operations in FIGS. 3A-3C may be at least partially associated with step 210 in FIG. 2.

Referring to FIGS. 3A-3C, various UIs displayed inside the display 130 of the electronic device are illustrated. Referring to FIG. 3A, the electronic device may display a UI (for example, a control panel and/or a quick panel) for controlling the state of each hardware component included in the electronic device. Inside the UI of FIG. 3A, toggle buttons for controlling activation and deactivation of hardware components and/or present functions of the electronic device may be displayed. A toggle button refers to a visual element for activating or deactivating a function corresponding to the toggle button according to the user's touch and/or click. The type and/or color of a toggle button may change between at least two preset types and/or colors according to whether or not the function is activated. For example, the first color (for example, blue) of a toggle button may indicate activation of the corresponding function, and a second color (for example, gray) thereof may indicate deactivation of the corresponding function. The first type of toggle button (for example, an icon including an airplane-type figure) may indicate activation of the corresponding function (for example, airplane mode), and the second type of toggle button (for example, an icon including an airplane-type figure and an overlapping cancellation line) may indicate deactivation of the function. The toggle buttons may respectively correspond to a Wi-Fi communication function, a mute function, a Bluetooth function, and a screen rotation locking function.

Referring to FIG. 3A, the electronic device may display a toggle button 310 for controlling activation and deactivation of the battery power sharing function inside the UI. If the user touches or clicks the toggle button 310 while the wireless power transmission mode is deactivated, the electronic device may activate the wireless power transmission mode based on steps 210 and 220 in FIG. 2, for example. When the wireless power transmission mode is activated, the electronic device may change the type and/or color of the toggle button 310 to a preset type and/or a preset color indicating activation of the wireless power transmission mode. In addition to the change in the type and/or color of the toggle button 310, the electronic device may output a text message for indicating activation of the wireless power transmission mode, an image therefor, a voice message therefor, a haptic signal therefor, or a combination thereof.

Referring to FIGS. 3A-3C, the electronic device may display a UI associated with the wireless power transmission mode, based on an application (for example, a setup application) which is provided based on the operating system, and which is for the purpose of controlling various functions supported by the electronic device. Referring to FIGS. 3A-3C, the electronic device may display a switch-type visual element 320 inside the UI. If the user touches or clicks the visual element 320, the electronic device may activate or deactivate the wireless power transmission mode, based on steps 210 and 220 in FIG. 2, similar to the toggle button 310.

The UI in FIG. 3B may correspond to a UI displayed to the user while the wireless power transmission mode is activated. The UI in FIG. 3B may be associated with the state of the battery for activating the wireless power transmission mode. For example, the electronic device may display a visual element 335 associated with a lower bound of SoC, which is used as a reference to limit charging of the external electronic device, inside the UI. The visual element 335 may visually display the lower bound of the SoC based on a type, such as a seekbar or a progress bar. The user may drag the visual element 335 to increase or decrease the lower bound of a SoC within a preset range (in the case of FIG. 3B, within the range of 15% to 100%).

If the SoC of the battery is less than or equal to the lower bound of a SoC corresponding to the visual element 335, the electronic device may not enter the wireless power transmission mode, may suspend charging the battery of the external electronic device, and/or may deactivate the wireless power transmission mode. The battery power sharing function of the electronic device and/or the wireless power transmission mode may be activated only if the SoC of the battery is greater than or equal to the lower bound of the SoC corresponding to the visual element 335.

The UI in FIG. 3C may corresponds to a UI displayed to the user while the wireless power transmission mode is deactivated. The UI in FIG. 3C may be associated with a condition to complete battery charging based on power received wirelessly. For example, the electronic device may display a visual element 345 associated with a target SoC used to determine the magnitude of power to be received from the external electronic device inside the UI. The visual element 345 may also visually display the target SoC based on a type similar to that of the visual element 335. The user may drag the visual element 345 to increase or decrease the target SoC within a preset range (in the case of FIG. 3C, within the range of 0% to 100%).

If the SoC of the battery exceeds the target SoC corresponding to the visual element 345 while the electronic device is charging the battery based on power wirelessly received from the external electronic device, the electronic device may suspend battery charging and/or may request the external electronic device to deactivate the wireless power transmission mode. In an embodiment, the electronic device may perform wireless reception of power from the external electronic device only when the SoC of the battery is below the target SoC corresponding to the visual element 345.

The layout of the UI provided to the user by the electronic device is not limited to the examples in FIGS. 3A-3C. For example, the Ins in FIG. 3B and FIG. 3C may be displayed independently of whether or not the wireless power transmission mode is activated, or may be displayed simultaneously or so as to overlap at least partially. Operations performed by the user to activate the battery power sharing function of the electronic device and/or the wireless power transmission mode may include other operations than the operation of selecting the toggle button 310 and/or the visual element 320 illustrated in FIGS. 3A-3C.

For example, the electronic device may activate the wireless power transmission mode based on the user's voice command (i.e., "Please activate the power share function.") and/or the user's operation of successively pressing at least one button of the electronic device in a preset order. For example, when the user connects the electronic device and the external electronic device based on wireless communication, the electronic device may activate the wireless power transmission mode based on the SoC of the battery included in the external electronic device. For example, the electronic device may activate the wireless power transmission mode when the user performs an operation of changing the posture of the electronic device (for example, the operation of laying down the electronic device 101 such that a surface of a housing of the electronic device on which the coil 165 in FIG. 1 is disposed is visible to the outside).

Hereinafter, operations of the electronic device activating the battery power sharing function and/or the wireless power transmission mode based on at least one precondition will be described.

Figure 4:
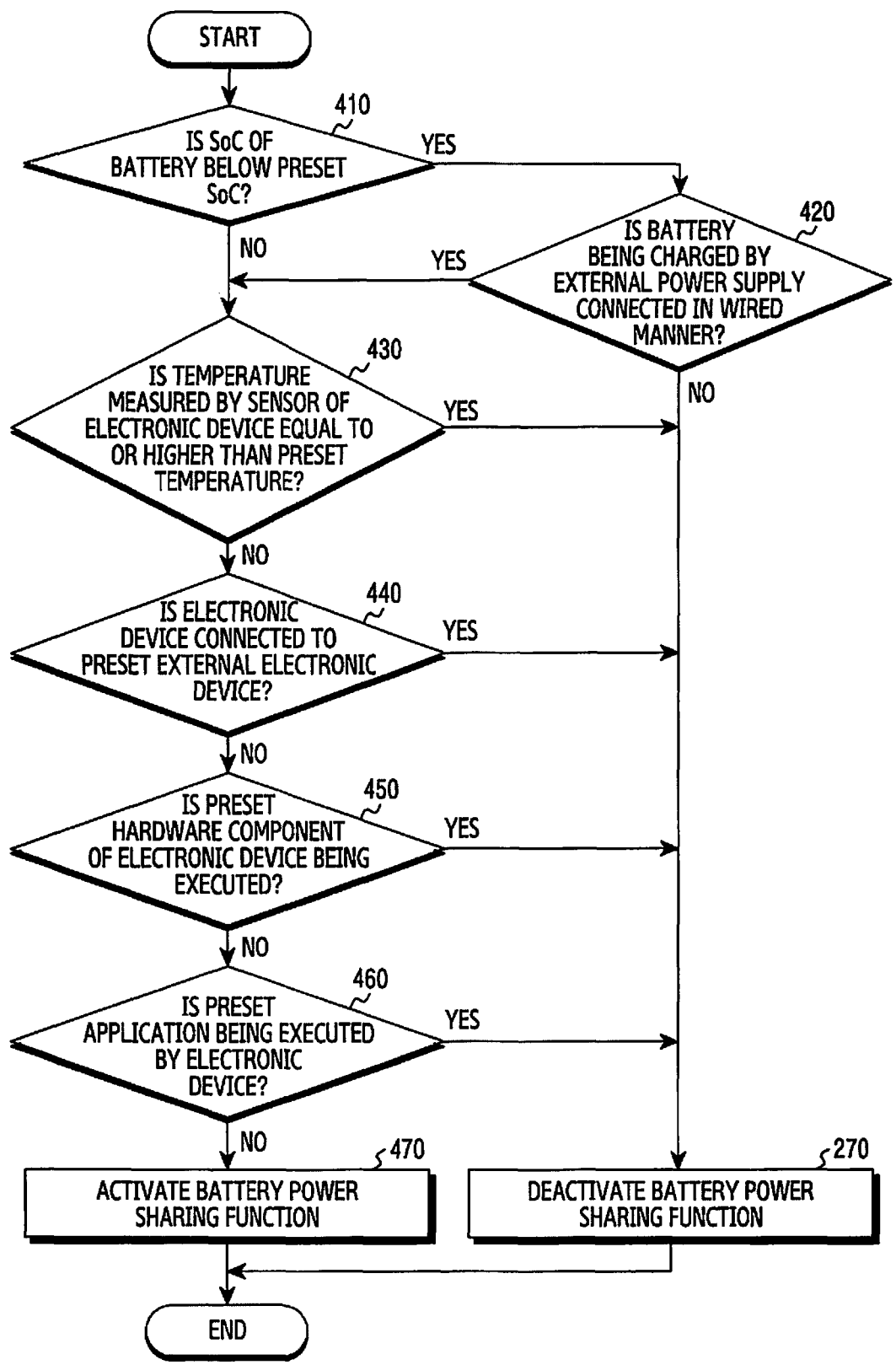
FIG. 4 is a flowchart illustrating an electronic device activating a battery power sharing function based on a battery state, according to an embodiment.

FIG. 4 is a flowchart illustrating an electronic device activating a battery power sharing function based on a battery state, according to an embodiment. The electronic device in FIG. 4 may correspond to the electronic device 101 in FIG. 1. The operations in FIG. 4 may be performed based on the electronic device 101, the processor 110, and/or the PMIC 150 in FIG. 1. The electronic device may assess the peripheral situation of the electronic device, including an external electronic device, and may determine whether to transmit power in the battery to the external electronic device or to receive power therefrom. The operations in FIG. 4 may be at least partially associated with step 220 in FIG. 2. For example, the operations in FIG. 4 may be performed in response to step 210 in FIG. 2 and/or in response to a user input which is identified inside the UI in FIGS. 3A-3C, and which is for the purpose of activating the battery power sharing function.

Referring to FIG. 4, in step 410, the electronic device determines whether or not the SoC of the battery is below a preset SoC. The SoC of the battery may be measured at a preset cycle by the PMIC 150 in FIG. 1, or may be measured in response to activation of the battery power sharing function. The preset SoC serves as a reference for limiting activation of the battery power sharing function, and may correspond to a lower bound of a SoC corresponding to the visual element 335 displayed inside the UI in FIG. 3B.

When the SoC of the battery is below the preset SoC, the electronic device determines, in step 420, whether or not the battery is being charged by an external power supply connected in a wired manner. The electronic device may enter the wireless power transmission mode based on whether or not the battery is being charged, although the SoC of the battery is below the preset SoC. For example, when the electronic device is charged by an external power supply (for example, a TA) connected in a wired manner, the electronic device may wirelessly output a part of the power received from the external power supply and may use the remaining power to charge the battery.

When the battery is not being charged by the external power supply connected in a wired manner, the electronic device deactivates the battery power sharing function in step 270. The electronic device may perform step 270 in FIG. 4 similarly to step 270 in FIG. 2. For example, when the battery is being charged by the external power supply connected in a wireless manner, the electronic device may not enter the wireless power transmission mode because the coil 165 of the electronic device used to share power in the battery is used to receive power. Since the electronic device does not enter the wireless power transmission mode, activation of the power sharing function and display of a UI corresponding to the wireless power transmission mode may be limited in spite of the user input identified in step 210 in FIG. 2.

When the SoC of the battery is greater than or equal to the preset SoC, the electronic device may activate the battery power sharing function based on all of the preconditions other than the SoC-related condition. Referring to FIG. 4, the electronic device determines in step 430 whether or not a temperature measured by a sensor is greater than or equal to a preset temperature. The sensor may be disposed inside the battery and/or adjacent to the battery. For example, the sensor may be disposed at a point inside the housing of the electronic device, which is relatively close to the battery and relatively far from other hardware components other than the battery, in order to measure heat discharged from the battery more accurately.

The preset temperature may be a value configured heuristically based on the characteristics of materials included in the battery. The preset temperature may be associated with a temperature that shortens the life of the battery relatively quickly. Based on the fact that the battery life is shortened relatively quickly at a low temperature, the electronic device may determine not only if the temperature measured by the sensor is greater than or equal to a preset upper-limit temperature, but also if the temperature is less than or equal to a present lower-limit temperature. When the measured temperature belongs to a range that shortens the battery life relatively quickly (for example, when the measured temperature is greater than or equal to the preset temperature), the electronic device may deactivate the battery power sharing function in accordance with step 270, or may not enter the wireless power transmission mode.

When the measured temperature does not belong to the above range, for example, when the measured temperature is below the preset temperature, the electronic device may perform operations based on the preconditions other than the temperature-related precondition. Referring to FIG. 4, the electronic device determines, in step 440, whether or not the electronic device is connected to a preset external electronic device. The preset external electronic device may include an external electronic device designated by the vendor of the electronic device. For example, the preset external electronic device may include a wireless charging dock and/or a hardware component for expanding the connectivity and/or operating mode of the electronic device. For example, the preset external electronic device may include an electronic device based on Samsung DEX™.

The preset external electronic device may include an external electronic device that can be connected to the electronic device based on an on-the-go (OTG) connection. In response to identification of an external electronic device connected to the electronic device based on the OTG connection, the electronic device may deactivate the wireless power transmission mode in accordance with step 270. In response to identifying that the electronic device charges an external electronic device connected based on the OTG connection, the electronic device may deactivate the battery power sharing function in accordance with step 270.

When the electronic device is not connected to any preset external electronic device, the electronic device may perform operations based on the all of the other preconditions other than the condition regarding the external electronic device. Referring to FIG. 4, the electronic device determines in step 450 whether or not a preset hardware component included in the electronic device is operating. The preset hardware component may correspond to a hardware component consuming a relatively large amount of power. For example, the preset hardware component may include a camera module including an image sensor. In response to identifying that a preset hardware component such as a camera module included in the electronic device is operating, the electronic device may not enter the wireless power transmission mode in accordance with step 270.

When no preset hardware component is operating inside the electronic device, the electronic device may determine whether or not all of the other preconditions than the condition regarding the hardware component, among the multiple preconditions, are satisfied. Referring to FIG. 4, the electronic device determines in step 460 whether or not a preset application is being executed inside the electronic device. The preset application may corresponds to an application requiring a relatively large amount of power. For example, the preset application may correspond to an operation that, when executed, operates a relatively large amount of hardware components inside the electronic device.

The preset application may include an application requiring the processor to perform a relatively large amount of operations, such as a game application. The preset application may include an application that simultaneously operates multiple hardware components (for example, the display 130, the processor 110, the memory 120, the communication circuit 190, and the speaker in FIG. 1), such as a video streaming application. The preset application may include an application based on a proximity communication technology, such as a payment application.

When the preset application is being executed, or when the electronic device is controlled based on an application designated by the user, the electronic device may deactivate the battery power sharing function in accordance with step 270. When no preset application is being executed, the electronic device may determine whether or not all of the preconditions other than the condition regarding the preset application are satisfied.

Referring to FIG. 4, after assessing multiple preconditions based on steps 410, 420, 430, 440, 450, and 460, respectively, the electronic device activates the battery power sharing function in step 470. The order according to which the electronic device assesses the multiple preconditions is not limited to the order of steps 410, 420, 430, 440, 450, and 460 illustrated in FIG. 4. For example, the electronic device may assess the multiple preconditions in an order different from the order in FIG. 4 and/or may simultaneously assess at least some of the preconditions. The type and/or number of preconditions assessed by the electronic device to activate the battery power sharing function are not limited to those illustrated in FIG. 4, and may differ depending on the embodiment.

As the battery power sharing function is activated, the electronic device may change the PMIC 150 and/or the wireless charging IC 160 in FIG. 1 to a state for transmitting power in the battery. For example, the electronic device may control the full bridge circuit of the wireless charging IC 160 in FIG. 1 to be driven as an inverter. As the battery power sharing function is activated, the electronic device may identify when a connection is established between an external electronic device and the electronic device based on the communication circuit 190 in FIG. 1. After activating the battery power sharing function and/or the wireless power transmission mode, the electronic device may perform at least one operation for sharing power in the battery, for example, beginning with step 230 in FIG. 2.

As described above, if at least one of the multiple preconditions is not satisfied, the electronic device may not enter the wireless power transmission mode in accordance with step 270. The electronic device may output a UI associated with the unsatisfied precondition.

Figure 5:
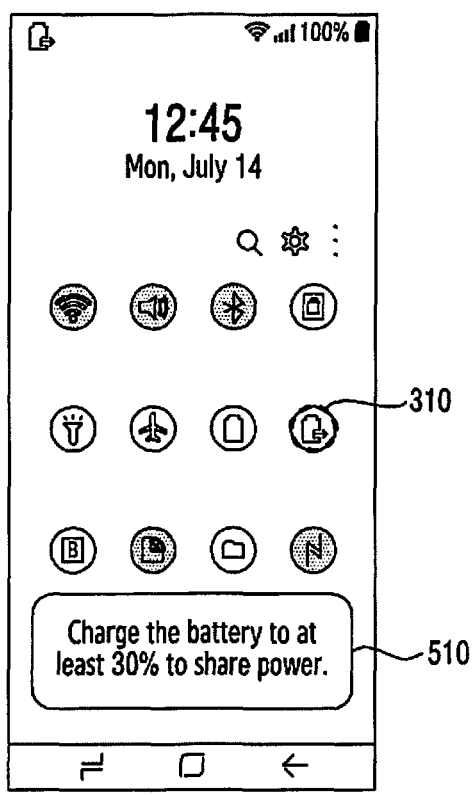
FIG. 5 is a diagram illustrating a message displayed by an electronic device based on a battery state, according to an embodiment.

FIG. 5 is a diagram illustrating a message 510 displayed by an electronic device based on a battery state, according to an embodiment. The electronic device in FIG. 5 may correspond to the electronic device 101 in FIG. 1. The operation in FIG. 5 may be at least partially associated with step 270 in FIG. 2 and/or FIG. 4.

Referring to FIG. 5, a UI displayed inside the display 130 of the electronic device is illustrated. The UI in FIG. 5 may be at least partially associated with the UI in FIG. 3A. The user may touch a toggle button 310 associated with a wireless power transmission mode among the multiple toggle buttons illustrated in FIG. 5. In response to a user input of selecting the toggle button 310 (for example, a user input of touching or clicking the toggle button 310), the electronic device may determine whether or not to enter the wireless power transmission mode at least partially based on steps 210 and 220 in FIG. 2 or the steps in FIG. 4.

When none of the multiple preconditions regarding entry into the wireless power transmission mode are satisfied, the electronic device may not perform step 230 in FIG. 2. For example, the electronic device may limit display of a UI that indicates activation of the wireless power transmission mode. The electronic device may perform step 270 in FIG. 2 or FIG. 4. In this case, the electronic device may display a UI 510 associated with deactivation of the battery power sharing function and/or the wireless power transmission mode in accordance with step 270. The UI 510 may be of the type of a popup window, such as a toast popup (i.e., a popup window that appears to slide from off the screen into a position on the screen). The UI 510 may be displayed inside the display for a preset time and may disappear from the display upon expiration of the preset time.

Referring to FIG. 5, the electronic device may display a visual element associated with an unsatisfied precondition inside the UI 510. The visual element may include a text message, an image, an icon, an animation and/or a video corresponding to the precondition. For example, the electronic device may display a visual element inside the UI 510, based on Table 1 below:

TABLE 1

| State | Text message included in visual element |
| --- | --- |
| SoC of battery < preset SoC | Charge the battery to at least 30% to share power. |
| Temperature of battery > preset temperature | Can't turn on power sharing. Your phone is too hot. Try again when it cools down. |
| Connection between external electronic device and electronic device based on OTG | Can't turn on power sharing while connected to a cable. |
| Connection between preset external electronic device (external electronic device based on Samsung DEX ™) and electronic device | Can't turn on power share while using Samsung DEX ™. |
| State in which preset hardware component (camera) operates | Can't turn on power share while using camera. |
| State in which preset application (game) operates | Can't turn on power share while game app is running. |

Referring to Table 1, if the user touches the toggle button 310 while the SoC of the battery is less than 30%, the electronic device may display a message to the user so as to limit entry into the wireless power transmission mode and to request battery charging, instead of entering the wireless power transmission mode. Entry of the electronic device into the wireless power transmission mode may be performed after an additional operation of the user, based on the UI 510 (for example, charging the battery, cooling the electronic device, disconnecting the external electronic device and the electronic device based on an OTG connection, suspending operation of a preset hardware component, or ending a preset application).

If all of the multiple preconditions illustrated in FIG. 4 and FIG. 5 are satisfied, the electronic device may enter the wireless power transmission mode in accordance with step 470 in FIG. 4. In this case, the electronic device may output a UI indicating activation of the wireless power transmission mode.

Figure 6A:
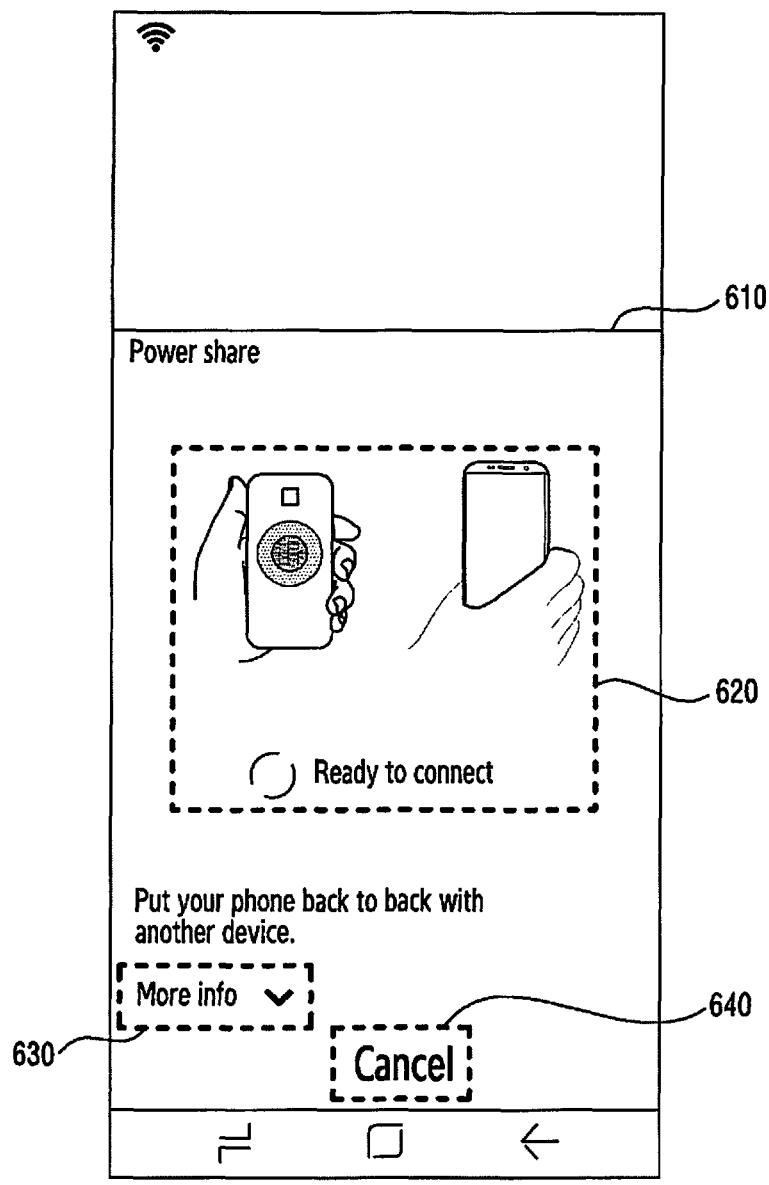
FIG. 6A is a diagram illustrating a UI displayed while an electronic device identifies an external electronic device to receive power in the battery thereof, according to an embodiment.
Figure 6B:
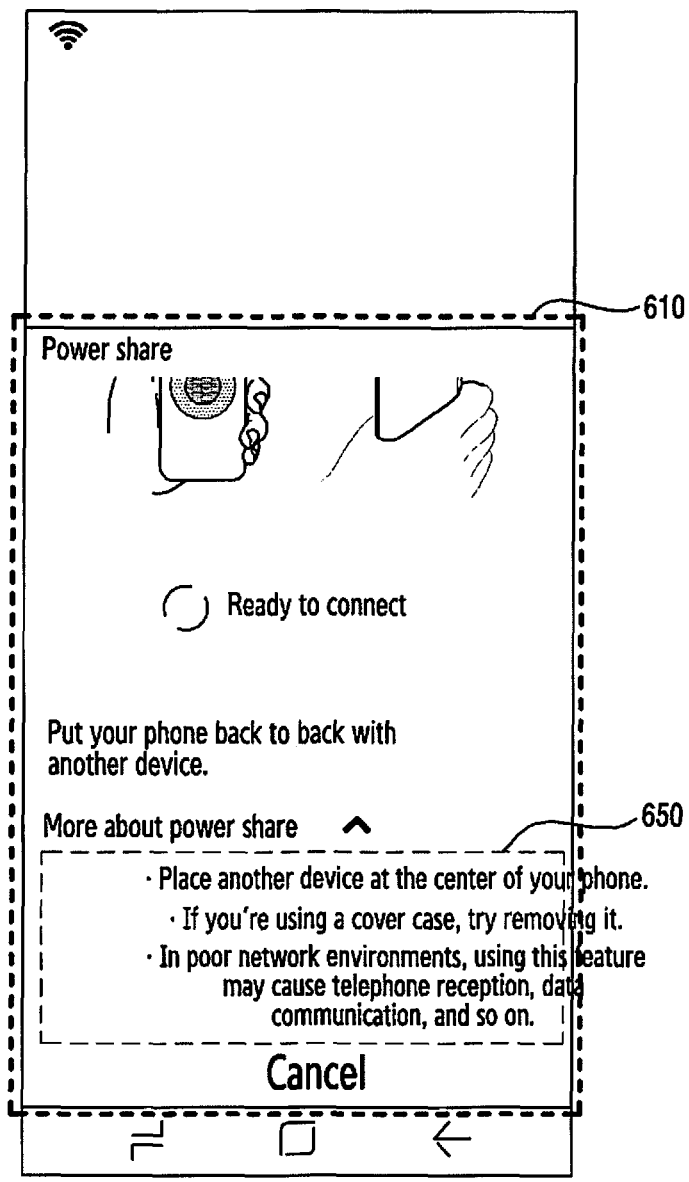
FIG. 6B is a diagram illustrating a UI displayed while an electronic device identifies an external electronic device to receive power in the battery thereof, according to an embodiment.
Figure 6C:
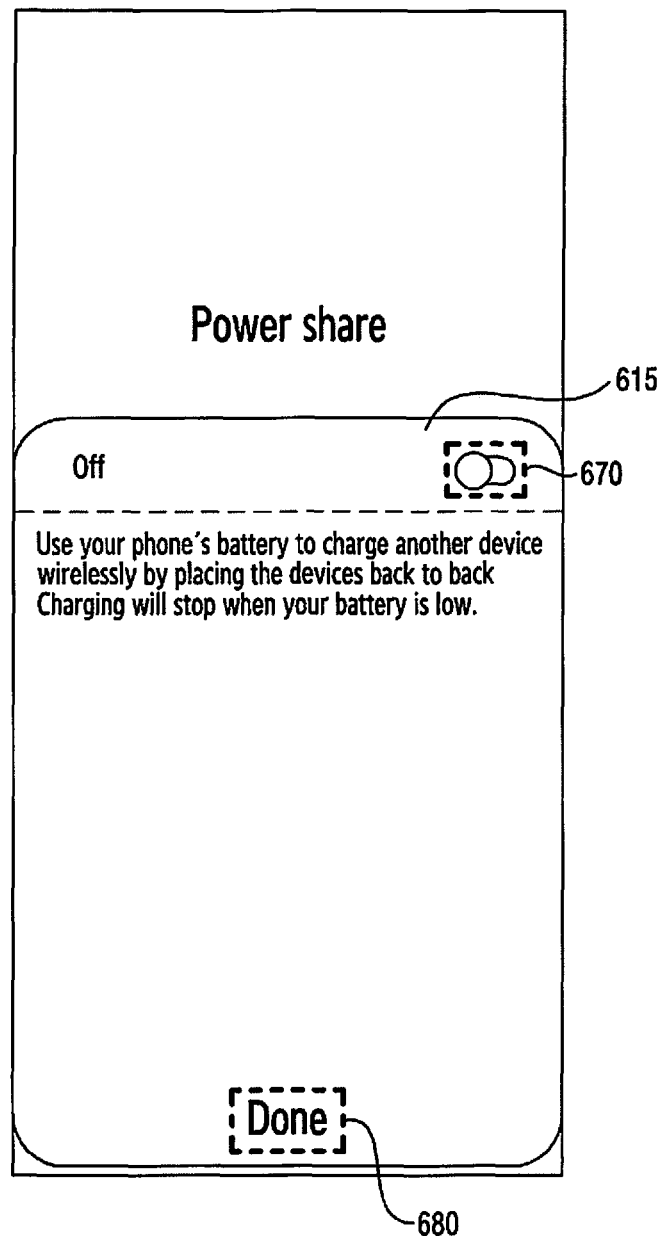
FIG. 6C is a diagram illustrating a UI displayed while an electronic device identifies an external electronic device to receive power in the battery thereof, according to an embodiment.

FIG. 6A is a diagram illustrating a UI 610 displayed while an electronic device identifies an external electronic device to receive power in the battery thereof, according to an embodiment. FIG. 6B is a diagram illustrating a UI 610 displayed while an electronic device identifies an external electronic device to receive power in the battery thereof, according to an embodiment. FIG. 6C is a diagram illustrating a UI 615 displayed while an electronic device identifies an external electronic device to receive power in the battery thereof, according to an embodiment. The electronic device in FIGS. 6A-6C may correspond to the electronic device 101 in FIG. 1. The operations of the electronic device associated with FIGS. 6A-6C may be at least partially associated with step 230 in FIG. 2 and/or step 470 in FIG. 4.

Referring to FIGS. 6A-6C, UIs 610 and 615 displayed inside the display 130 of the electronic device are illustrated. The UIs 610 and 615 in FIGS. 6A-6C may be displayed in response to a user input which is performed inside the UIs in FIGS. 3A-3C, and which activates the battery power sharing function. With no external electronic device identified, the electronic device may keep displaying the UIs 610 and 615 for a preset time.

Referring to FIGS. 6A-6C, an example of a UI 610 displayed inside the display, while the electronic device identifies an external electronic device based on wireless communication, is illustrated. The electronic device may display at least one visual element inside the UI 610 so as to indicate that the electronic device is awaiting connection between the external electronic device and the electronic device in the current state.

Referring to FIG. 6A, the electronic device may notify the user of the posture of the electronic device and that of the external electronic device required to share power in the battery, based on the visual element 620 included in the UI 610. The visual element 620 may include an image, an animation, and/or a video. For example, the visual element 620 may include an animation that illustrates a gradually decreasing distance between rear surfaces of the electronic device and the external electronic device, respectively. The rear surfaces may correspond to surfaces of the housings of the electronic device and the external electronic device, on which coils are disposed, respectively.

The electronic device may display online help associated with the battery power sharing function inside the UI 610. In the example of FIG. 6A, the electronic device may display a visual element 630 associated with display of the online help inside the UI 610. If the user touches or clicks the visual element 630, the electronic device may output a visual element 650 included in the UI 610 as illustrated in FIG. 6B, thereby displaying online help or information regarding the battery power sharing function. The online help or information may include a condition to share power in the battery more efficiently (for example, removing an accessory coupled to the electronic device, such as a case) and/or a condition that makes battery power sharing more difficult (for example, network congestion or lacking battery SoC).

The electronic device may display a visual element 640 for canceling the battery power sharing function inside the UI 610. If the user touches or clicks the visual element 640, the electronic device may stop displaying the UI 610 and may deactivate the battery power sharing function.

Referring to FIG. 6C, another example of a UI 615 displayed inside the display, while the electronic device identifies an external electronic device based on wireless communication is illustrated. The electronic device may display a visual element 670 that controls whether or not the battery sharing function is activated, inside the UI 615. The electronic device may display online help or information regarding the battery power sharing function inside the UI 615, similarly to FIG. 6A or FIG. 6B. The electronic device may further display a visual element 680 for suspending display of the UI 615, inside the UI 615. If the user touches or clicks the visual element 680, the electronic device may suspend display of the UI 615. After suspending display of the UI 615, according to selection of the visual element 680, the electronic device may identify an external electronic device based on the battery power sharing function.

When the electronic device has identified an external electronic device, the electronic device may suspend display of the UI 615 or may output a visual element inside the UI 610 so as to indicate that an external electronic device has been identified. A UI displayed by the electronic device, based on the identified external electronic device, will be described in detail with reference to FIGS. 8A-8C.

Figure 7A:
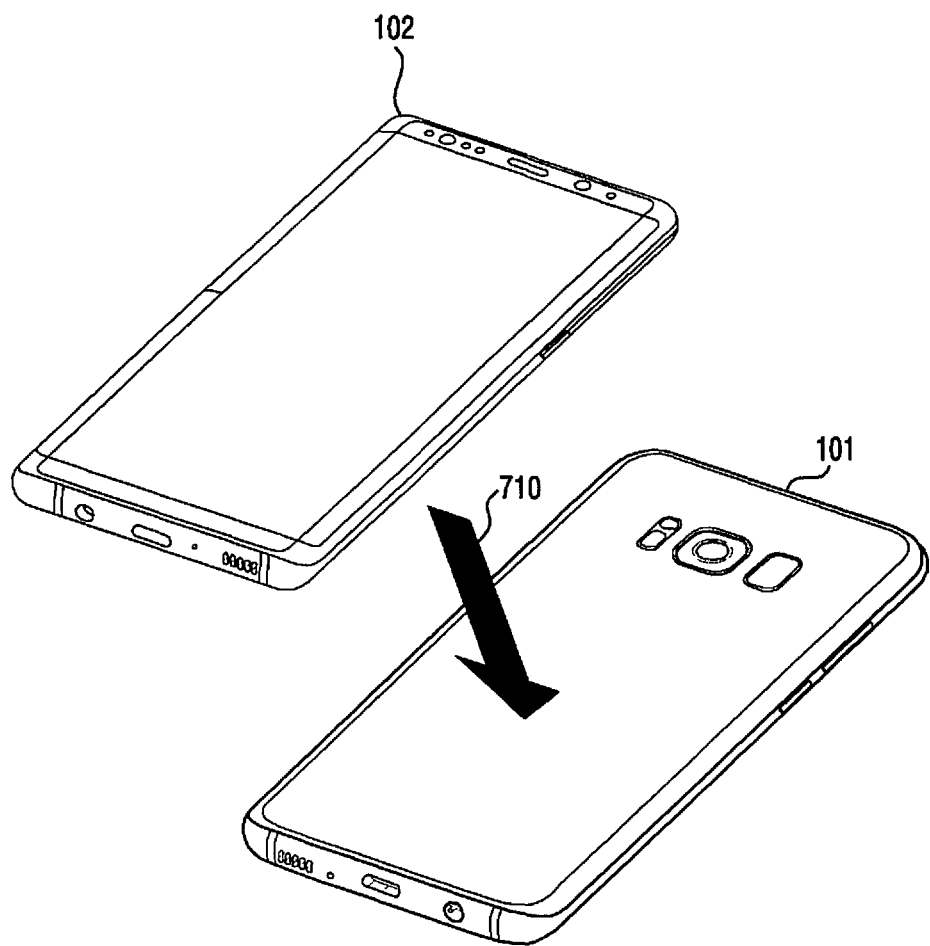
FIG. 7A is a diagram illustrating a user moving electronic devices in order to wirelessly share power in the batteries thereof, according to an embodiment.
Figure 7B:
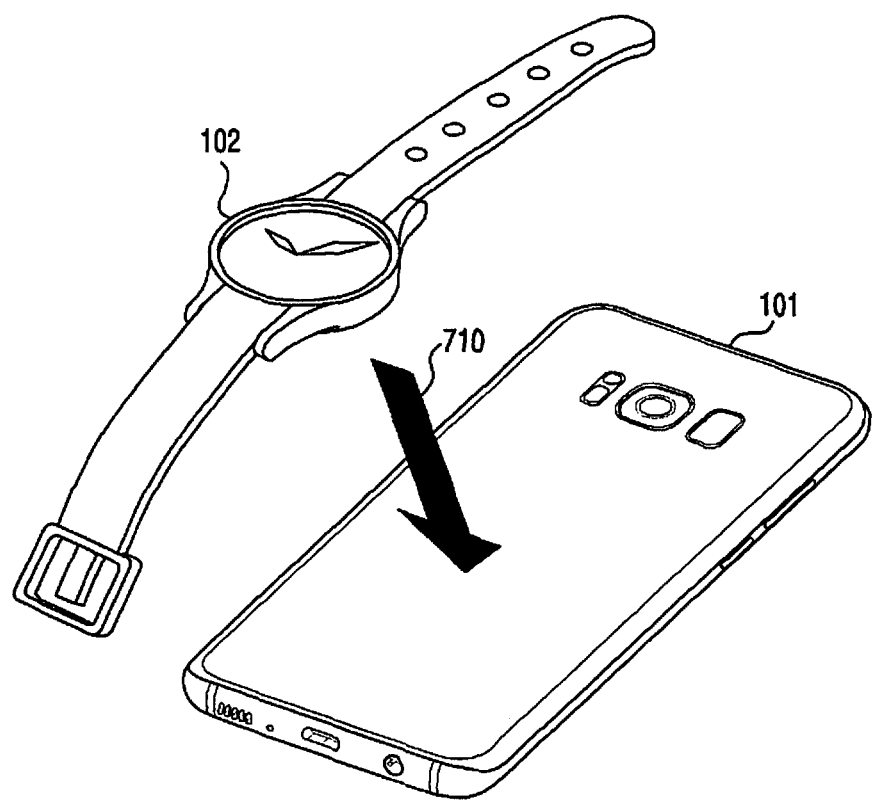
FIG. 7B is a diagram illustrating a user moving electronic devices in order to wirelessly share power in the batteries thereof, according to an embodiment.

FIG. 7A is a diagram illustrating a user moving electronic devices 101 and 102 to wirelessly share power in the batteries thereof, according to an embodiment. FIG. 7B is a diagram illustrating a user moving electronic devices 101 and 102 to wirelessly share power in the batteries thereof, according to an embodiment. The electronic devices 101 and 102 in FIG. 7A and FIG. 7B may correspond to the electronic devices 101 and 102 in FIG. 1.

The user may control the electronic device 101 so as to activate the battery power sharing function of the electronic device 101. The electronic device 101 may activate the battery power sharing function at least partially based on steps 210 and 220 in FIG. 2 and/or the steps in FIG. 4. In response to activation of the battery power sharing function, the electronic device 101 may output a UI based on step 230 in FIG. 2 or FIGS. 6A-6C, for example. The user's operations illustrated in FIGS. 7A-7B may be performed while the electronic device 101 outputs the UI.

Referring to FIG. 7A, the user may move an external electronic device 102, which is distinguished (i.e., different) from the electronic device 101, toward the electronic device 101 in a direction 710. For example, referring to FIG. 7B, the external electronic device 102 moved by the user in the direction 710 may be an accessory device distinguished from the electronic device 101, such as a smart watch. The user may bring the rear surface of the electronic device 101 and the rear surface of the external electronic device 102 into contact with each other. While the rear surface of the electronic device 101 and the rear surface of the external electronic device 102 contact each other, the distance between the coil disposed on the rear surface of the electronic device 101 and the coil disposed on the rear surface of the external electronic device 102 may decrease and become smaller.

As a result of the contact between the rear surface of the electronic device 101 and the rear surface of the external electronic device 102, wireless connection may be established between the electronic device 101 and the external electronic device 102. The wireless connection may be established based on wireless communication associated with the communication circuit 190 in FIG. 1 (for example, Bluetooth and/or NFC) or at least partially based on in-band communication associated with the coil 165 in FIG. 1. In response to identification of the wireless connection being established, the electronic device 101 may initiate output of power in the battery to the external electronic device 102. In response to identification of the wireless connection being established, the electronic device 101 may notify the user of connection of the external electronic device 102 or may display a UI that indicates that power in the battery is output. Hereinafter, operations performed by the electronic device 101 when transmitting power in the battery to the external electronic device 102 will be described in detail with reference to FIGS. 8A-8C, FIG. 9, and FIG. 10.

Figure 8A:
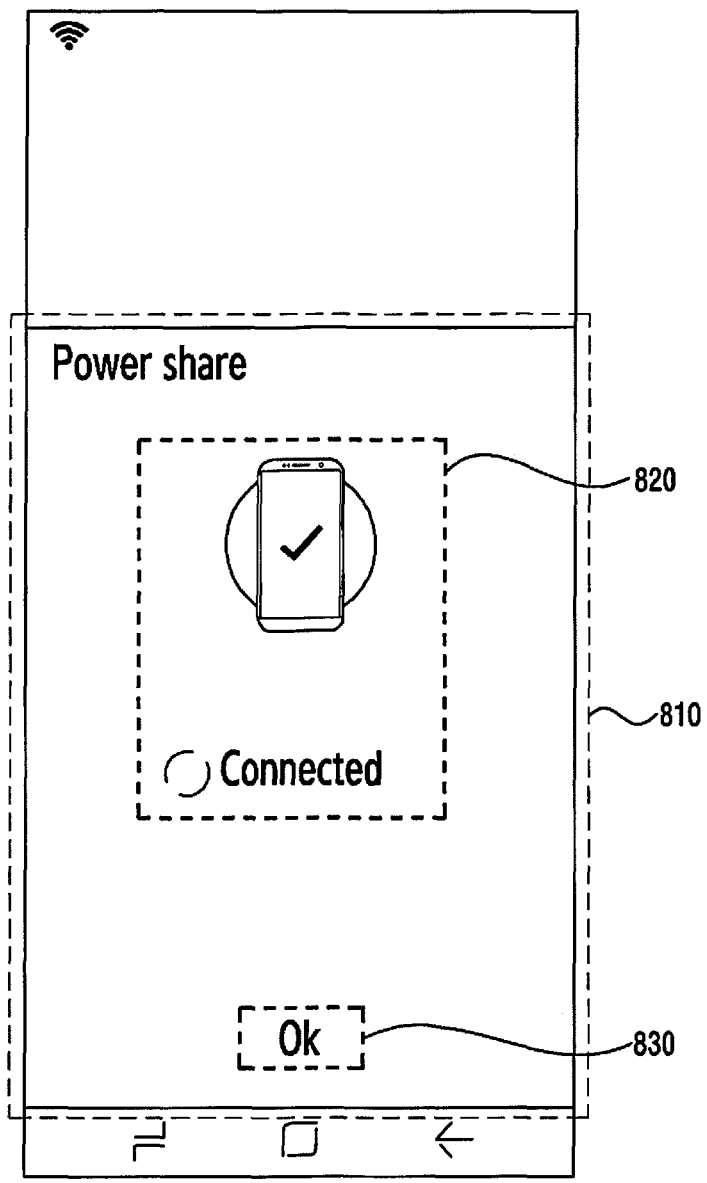
FIG. 8A is a diagram illustrating a UI displayed while an electronic device outputs power in the battery thereof to an external electronic device, according to an embodiment.
Figure 8B:
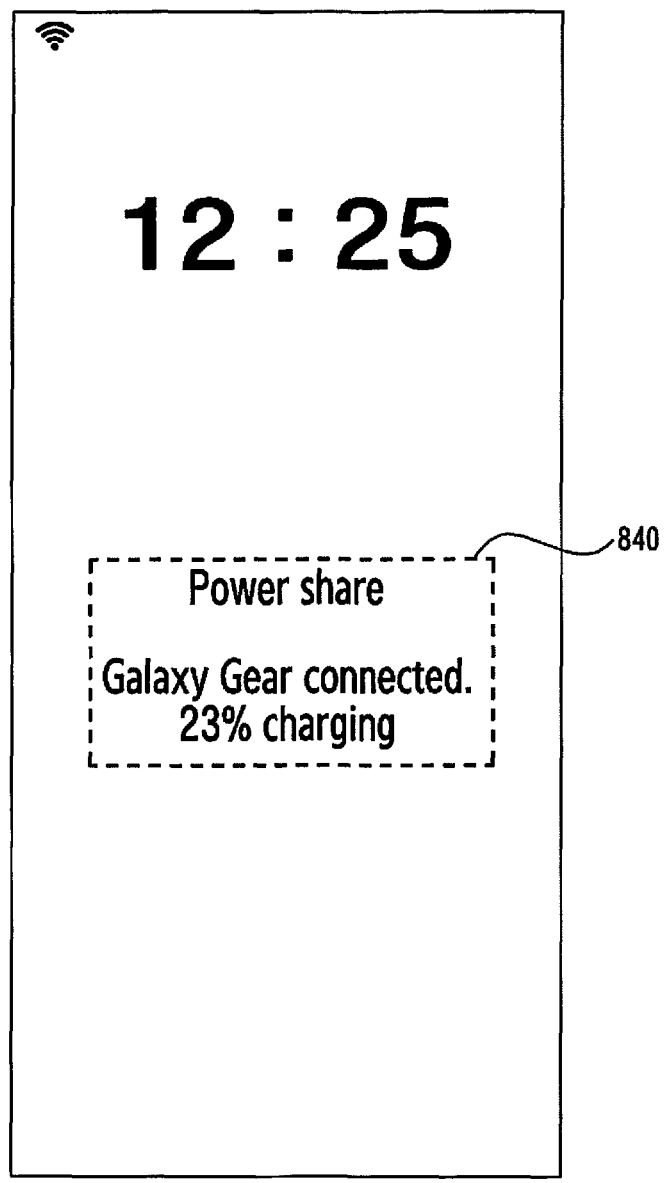
FIG. 8B is a diagram illustrating a UI displayed while an electronic device outputs power in the battery thereof to an external electronic device, according to an embodiment.
Figure 8C:
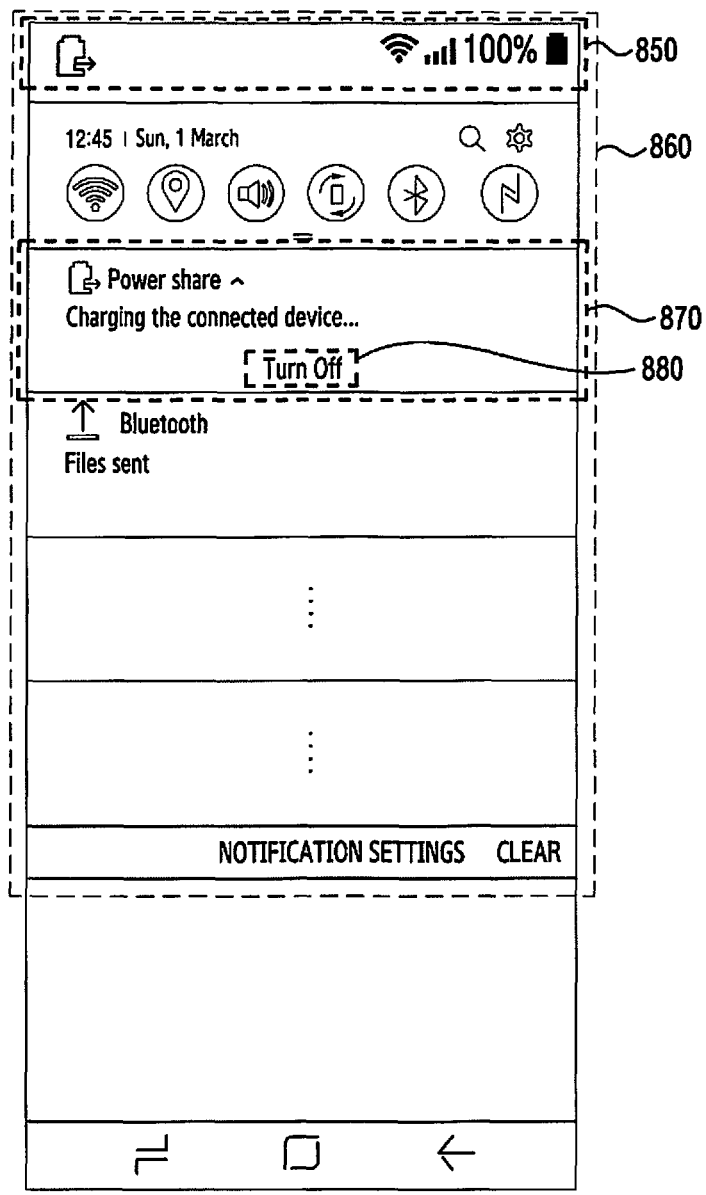
FIG. 8C is a diagram illustrating a UI displayed while an electronic device outputs power in the battery thereof to an external electronic device, according to an embodiment.

FIG. 8A is a diagram illustrating a UI 810 displayed while an electronic device outputs power in the battery thereof to an external electronic device, according to an embodiment. FIG. 8B is a diagram illustrating a UI 840 displayed while an electronic device outputs power in the battery thereof to an external electronic device, according to an embodiment. FIG. 8C is a diagram illustrating a UI 870 displayed while an electronic device outputs power in the battery thereof to an external electronic device, according to an embodiment. The electronic device in FIGS. 8A-8C may correspond to the electronic device 101 in FIG. 1. Operations of the electronic device associated with FIGS. 8A-8C may be at least partially associated with step 250 in FIG. 2.

Referring to FIGS. 8A-8C, ins 810, 840, and 870 displayed inside the display 130 of the electronic device are illustrated. The UIs 810, 840, and 870 in FIGS. 8A-8C may be displayed based on the UIs 610 and 615 in FIGS. 6A-6C and/or the user's operations in FIGS. 7A-7B. For example, if the user of the electronic device brings the rear surface of the electronic device and the rear surface of the external electronic device into contact with each other as in FIG. 7A while the electronic device displays the UI 610 of FIG. 6A inside the display, then the electronic device may display at least one of the UIs 810, 840, and 870 of FIGS. 8A-8C inside the display.

After the user of the electronic device brings the rear surface of the electronic device and the rear surface of the external electronic device into contact with each other, the electronic device may display at least one of the UIs 810, 840, and 870 of FIGS. 8A-8C inside the display in response to identification of establishment of wireless connection between the electronic device and the external electronic device. The UIs 810, 840, and 870 may indicate to the user that the electronic device and the external electronic device have been successfully connected. While displaying at least one of the UIs 810, 840, and 870, the electronic device may output a voice signal and/or a haptic feedback such as a vibration. The type of the UI output by the electronic device in response to identification of establishment of wireless connection between the external electronic device and the electronic device may vary depending on whether or not the mute mode and/or the vibration mode of the electronic device are activated.

Referring to FIG. 8B, the electronic device may display a visual element 820 inside the UI 810 so as to indicate that a wireless connection has been established between the external electronic device and the electronic device. The visual element 820 may include an image and/or a text associated with the state of the wireless connection. The electronic device may display a visual element 830 for suspending display of the UI 810, inside the UI 810. The visual element 830 may have a type based on a button, an image, and/or a text. If the user touches or clicks the visual element 830, the electronic device may suspend display of the UI 810. The electronic device may display the UI 810 for a preset time (for example, three seconds) and may suspend display of the UI 810 upon expiration of the present time. Battery power sharing of the electronic device with an external electronic device may be performed independently of whether or not the UI 810 is displayed.

If the coil of the electronic device and the coil of the external electronic device contact each other after a wireless connection is established between the electronic device and the external electronic device, the electronic device may transmit power in the battery to the external electronic device based on the wireless power transmission mode. As power in the battery of the electronic device is transmitted to the external electronic device, charging of the battery of the external electronic device may be initiated. While power in the battery of the electronic device is transmitted to the external electronic device, the electronic device may provide the user with information regarding transmission of power in the battery.

Referring to FIG. 8B, the electronic device may display a visual element 840 inside the lock screen so as to indicate that a wireless connection has been established between the external electronic device and the electronic device. The lock screen may be displayed based on an always-on display (AOD) mode. The AOD mode is an operating mode of the electronic device, and may refer to a mode in which information is displayed inside the display based on a hardware component (for example, a display driving circuit (DDC)) associated with the display while the processor 110 of the electronic device maintains a sleep state. The visual element 840 displayed inside the lock screen may indicate the wireless connection and/or activation of the wireless power transmission mode.

Referring to FIG. 8C, the electronic device may display a visual element 870 for providing information regarding transmission of power in the battery inside a preset UI 860 such as a notification center. The UI 860 may be displayed based on the user's preset operation (for example, a drag input starting in a preset area 850 of the display and ending in another area of the display other than the preset area 850). The UI 860 may include notification messages identified from multiple applications currently executed by the electronic device. Referring to FIG. 8C, the visual element 870 displayed inside the UI 860 while the electronic device shares power in the battery may include a text message indicating that power in the battery is being transmitted to the external electronic device, and a visual element 880 that can be used to deactivate the battery power sharing function. If the user clicks or touches the visual element 880, the electronic device may suspend transmitting power in the battery to the external electronic device.

The electronic device may display information regarding the battery power sharing function (for example, an SoC of the external electronic device) inside the UI 810 and/or the visual element 840 and 870 of FIGS. 8A-8C. Hereinafter, operations of processing information, including the SoC of the external electronic device, while the electronic device shares power in the battery will be described in detail with reference to FIG. 9.

Figure 9:
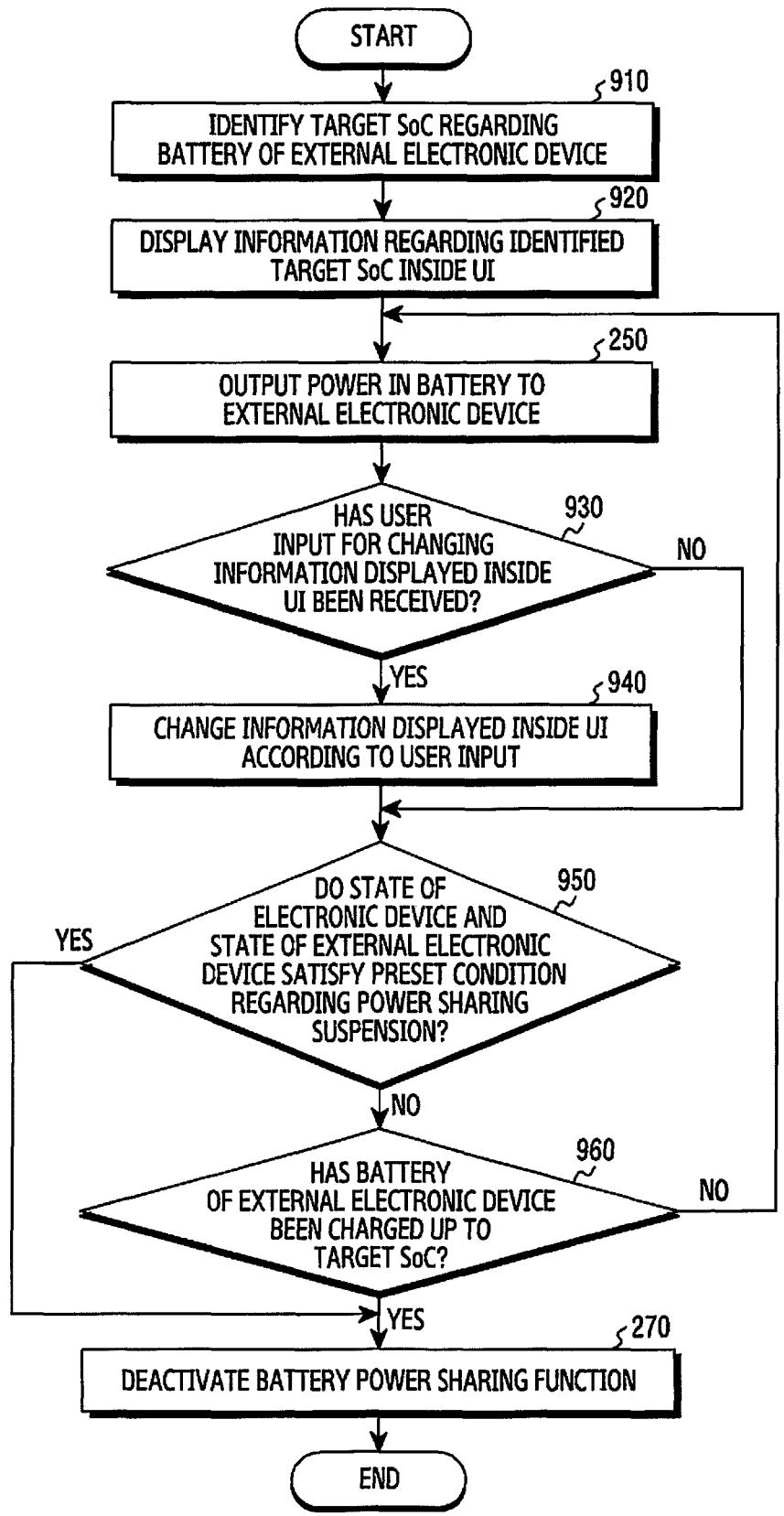
FIG. 9 is a flowchart illustrating an electronic device sharing battery power based on a user input performed in a UI associated with a battery power sharing function, according to an embodiment.

FIG. 9 is a flowchart 900 illustrating operations of an electronic device sharing battery power based on a user input performed in a UI associated with to a battery power sharing function, according to an embodiment. The electronic device in FIG. 9 may correspond to the electronic device 101 in FIG. 1. The operations in FIG. 9 may be performed based on the electronic device 101, the processor 110, and/or the PMIC 150 in FIG. 1. The electronic device may assess the peripheral situation of the electronic device, including an external electronic device, while transmitting power in the battery to the external electronic device, thereby determining whether to maintain the power transmission or to suspend the same. At least one of the steps in FIG. 9 may be at least partially associated with steps 240, 250, 260, and 270 in FIG. 2.

Referring to FIG. 9, in step 910, the electronic device identifies a target SoC regarding the battery of the external electronic device. The target SoC may be identified from a parameter prestored in the memory of the electronic device or the external electronic device. The target SoC may be identified from the external electronic device, based on a wireless connection established between the external electronic device and the electronic device. The target SoC may be configured by the user of the electronic device and/or the external electronic device, based on the UI 340 and/or the visual element 345 of FIG. 3C.

Step 910 may be performed in response to identifying the external electronic device based on step 240 of FIG. 2. In step 910, the electronic device identifies information which includes the target SoC, and which is associated with the battery of the external electronic device. For example, in response to identifying the connection between the external electronic device and the electronic device established by using the communication circuit within the preset time, the electronic device may identify the SoC of the battery included in the external electronic device and/or the target SoC.

Referring to FIG. 9, in step 920, the electronic device displays information regarding the identified target SoC inside the UI. The UI may include the UIs displayed while power in the battery is shared, illustrated in FIGS. 6A-6C and FIGS. 8A-8C. The electronic device may display a visual element that makes it possible to change the target SoC, inside the UI. The UI displayed by the electronic device in connection with the target SoC will be described in detail with reference to FIG. 10.

The information displayed by the electronic device inside the UI may not be limited to the target SoC. The electronic device may display information regarding the battery of the external electronic device, inside the UI. For example, the electronic device may display the SoC of the battery of the external electronic device and/or the time at which charging of the battery of the external electronic device is expected to be completed, inside the UI. The type of the UI may correspond to one of the types of an AOD-mode lock screen, a popup window, and/or an ongoing notification in the notification center.

Referring to FIG. 9, while information regarding the SoC is displayed inside the UI, the electronic device may output power in the battery to the external electronic device in accordance with step 250. In order to perform charging of the battery of the external electronic device at a higher speed, the electronic device and/or the external electronic device may switch the operating state. For example, while sharing power in the battery of the electronic device, the electronic device and/or the external electronic device may enter a power-saving mode or end at least one application currently executed in the background. The electronic device may request the external electronic device to enter the power saving mode, to end the application currently being executed by the external electronic device, and/or to power off.

Referring to FIG. 9, in step 930, the electronic device receives a user input for changing information displayed inside the UI. For example, the user may control a visual element associated with the target SoC displayed inside the UI, thereby performing a user input for changing the target SoC. The user input associated with the target SoC will be described in detail with reference to FIG. 10.

In response to reception of the user input, the electronic device changes the information displayed inside the UI according to the user input in step 940. For example, in response to reception of a user input for changing the target SoC while the target SoC and the expected time of completion of charging of the battery of the external electronic device are displayed inside the UI, the electronic device may change the target SoC and the expected time displayed inside the UI.

Referring to FIG. 9, in step 950, the electronic device determines whether or not the state of the electronic device and that of the external electronic device satisfy a preset condition associated with suspending power sharing. For example, the electronic device may determine whether or not the state of the electronic device and that of the external electronic device satisfy a preset condition associated with suspending power sharing, based on multiple parameters associated with the electronic device and the external electronic device. The multiple parameters may include the SoC, temperature, and power reception sensitivity of the electronic device and/or the external electronic device. Operations of the electronic device suspending the sharing of power in the battery with the external electronic device, based on step 950, will be described in detail with reference to FIG. 12 and FIGS. 13A-13C.

When the state of the electronic device and that of the external electronic device correspond to a state that enables power sharing, the electronic device determines, in step 960, whether or not the battery of the external electronic device has been charged up to the target SoC. As power in the battery is output to the external electronic device in accordance with step 250, the SoC of the battery of the external electronic device may gradually increase. Referring to FIG. 9, when the SoC of the battery of the external electronic device remains below the target SoC, the electronic device may keep outputting power in the battery in accordance with step 250. When the SoC of the battery of the external electronic device remains below the target SoC, the electronic device determines, in step 950, whether or not the state of the external electronic device and that of the electronic device satisfy a preset condition for suspending power sharing.

Referring to FIG. 9, while outputting power in the battery to the external electronic device in accordance with step 250, the electronic device determines whether or not to suspend battery power output based on the SoC of the battery of the external electronic device, the user input performed inside (i.e., input into) the UI by the user of the electronic device, the state of the electronic device, and/or the state of the external electronic device. If at least one of the SoC of the battery of the external electronic device, the user input performed inside the UI by the user of the electronic device, the state of the electronic device, and/or the state of the external electronic device is improper to output power in the battery, the electronic device may limit output of power in the battery to the external electronic device. When at least one of the SoC of the battery of the external electronic device, the user input performed inside the UI by the user of the electronic device, the state of the electronic device, and/or the state of the external electronic device is appropriate to output power in the battery, the electronic device outputs power in the battery to the external electronic device in accordance with step 250, thereby increasing the SoC of the battery of the external electronic device to the target SoC.

If the preset condition in step 950 is satisfied, or if the battery of the external electronic device is charged up to the target SoC, the electronic device deactivates the battery power sharing function in accordance with step 270. Step 270 in FIG. 9 is similar to step 270 in FIG. 2. As the power sharing function is deactivated, charging of the battery of the external electronic device based on the battery of the electronic device may be suspended.

When the user changes information regarding battery power sharing displayed inside the UI, the electronic device may output power in the battery to the external electronic device based on at least one parameter associated with the function input by the user and the SoC of the battery of the external electronic device. For example, when the user has changed the target SoC displayed inside the UI, the electronic device may output power in the battery to the external electronic device while identifying the SoC of the battery of the external electronic device, which is less than or equal to the changed target SoC. Hereinafter, operations of the electronic device performing a battery power sharing function based on a user input identified inside the UI will be described with reference to FIG. 10.

Figure 10:
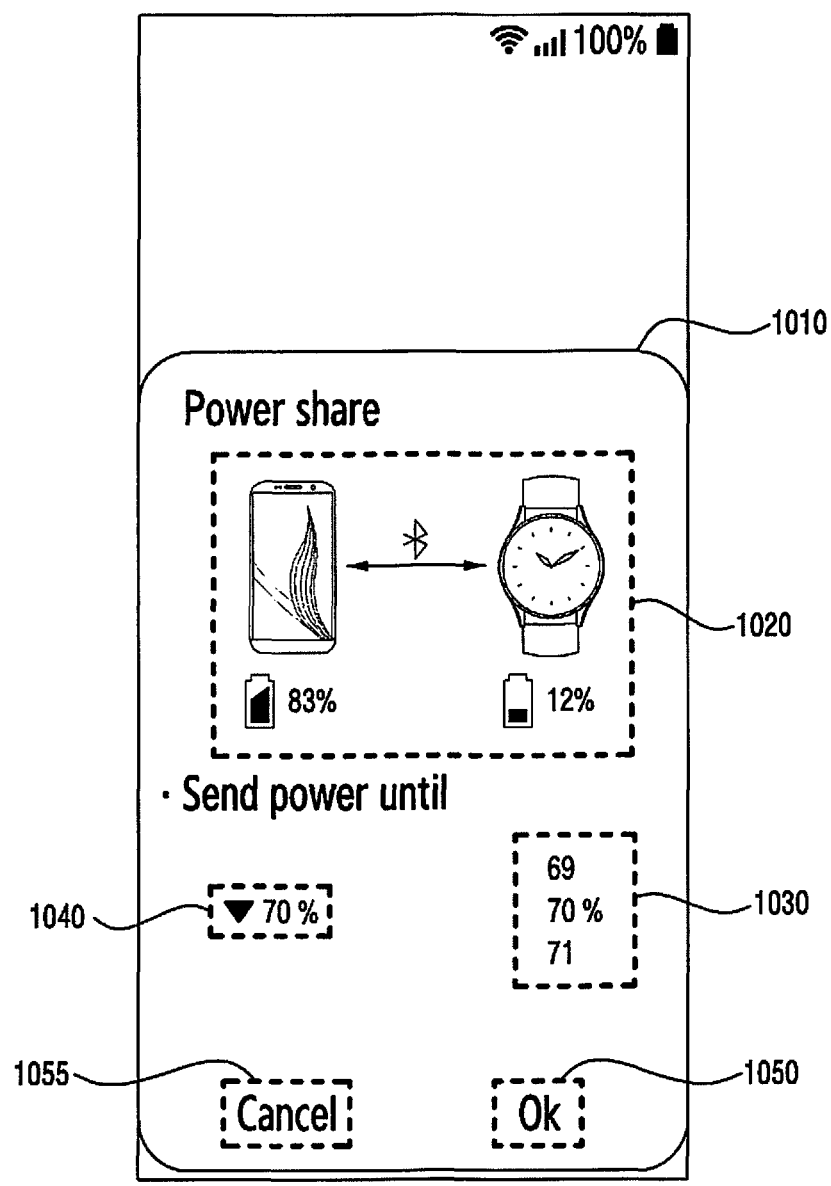
FIG. 10 is a diagram illustrating a UI associated with a battery power sharing function displayed on a display by an electronic device, according to an embodiment.

FIG. 10 is a diagram illustrating a UI 1010 associated with a battery power sharing function displayed on a display by an electronic device, according to an embodiment. The electronic device in FIG. 10 may correspond to the electronic device 101 in FIG. 1. Operations of the electronic device associated with FIG. 10 may be associated with step 230 in FIG. 2 and/or the operations in FIG. 9.

Referring to FIG. 10, while charging the battery of the external electronic device based on a wireless power transmission mode, the electronic device may output a UI 1010 inside the display 130. In response to a user input identified while supplying power in the battery to the external electronic device, the electronic device may display the UI 1010 inside the display. For example, if the user touches the visual element 870 displayed inside the notification center of FIG. 8C, the electronic device may display the UI 1010 inside the display.

The electronic device may display visual elements 1050 and 1055 for limiting display of the UI 1010, inside the UI 1010. The visual element (for example, Ok button) 1050 may indicate, while suspending display of the UI 1010, the electronic device outputs power in the battery to the external electronic device based on at least one parameter displayed inside the UI 1010. The visual element (for example, Cancel button) 1055 may indicate, while suspending display of the UI 1010, the electronic device outputs power in the battery to the external electronic device based on a value preceding display of at least one parameter inside the UI 1010.

The electronic device may display a visual element 1020 including at least one parameter associated with the battery power sharing function and/or the wireless power transmission mode inside the UI 1010. Referring to FIG. 10, by using the visual element 1020, the electronic device may display the type of the external electronic device connected to the electronic device (for example, a wristwatch-type external electronic device that can be worn around the user's wrist), the state of wireless connection between the external electronic device and the electronic device, whether or not power in the battery is shared, and the SoC of each of the external electronic device and the electronic device. If the wireless connection between the external electronic device and the electronic device is suspended, or if charging of the battery of the external electronic device is suspended, the electronic device may change display of the UI 1010. For example, the electronic device may display a text message inside the visual element 1020 so as to indicate suspension of the wireless connection and/or suspension of the battery charging.

The electronic device may identify a user input associated with a visual element indicating information regarding the battery included in the external electronic device. At least partially based on identification of the user input, the electronic device may control output of power in the battery to the external electronic device through the coil. For example, the electronic device may display a visual element 1030 associated with the target SoC inside the UI 1010. The visual element 1030 may include at least one button for selecting the target SoC within a preset range (for example, within the range of 0% to 100%), a number picker, a text field, and a slide bar.

Based on a touch and/or a drag gesture performed by the user inside the visual element 1030, the electronic device may identify the target SoC changed by the user. Based on identification of the target SoC changed by the user, the electronic device may output power in the battery to the external electronic device. For example, in a state in which the SoC of the battery of the external electronic device remains below the target SoC displayed by the visual element 1030, the electronic device may keep outputting power in the battery. In a state in which the SoC of the battery of the external electronic device exceeds the target SoC displayed by the visual element 1030, the electronic device may suspend outputting power in the battery to the external electronic device through the coil. The target SoC displayed inside the visual element 1030 may be used to determine the limit regarding to what extent the battery of the external electronic device will be charged.

After completely charging the battery of the external electronic device based on the target SoC displayed by the visual element 1030, the electronic device may identify a change in the SoC of the battery of the electronic device. The electronic device may display the SoC of the battery of the electronic device after charging the battery of the external electronic device up to the target SoC through the visual element 1040 included in the UI 1010 (for example, by displaying an SoC changed from the current SoC of the battery based on the change in the SoC). The SoC displayed inside the visual element 1040 may correspond to a predicted SoC of the battery of the electronic device after charging the battery of the external electronic device. If the user changes the target SoC based on a user input associated with the visual element 1030, the electronic device may adjust the predicted SoC displayed inside the visual element 1040 based on the changed SoC.

The electronic device may output power in the battery to the external electronic device through the coil of the electronic device based on at least one parameter associated with the function that has been input by a user and the SoC of the battery of the external electronic device. Referring to FIG. 9, the electronic device may output power in the battery to the external electronic device based on the target SoC (for example, 70%) input through the visual element 1030. The electronic device may acquire the predicted SoC displayed inside the visual element 1040 based on the target SoC. When the user adjusts the target SoC through the visual element 1030, the electronic device may change the predicted SoC displayed inside the visual element 1040 and the timepoint to suspend battery power output.

In a state in which the SoC of the battery of the external electronic device is below the target SoC, the electronic device may keep outputting power in the battery. When the SoC of the battery of the external electronic device corresponds to the target SoC or exceeds the target SoC, the electronic device may suspend battery power output.

The electronic device may identify a lower bound of the SoC, which is used to limit charging of the external electronic device based on the visual element 1030. For example, if the user has configured the lower bound of the SoC to be 70% by using the visual element 1030, and if the SoC of the battery of the electronic device is greater than or equal to 70%, the electronic device may output power in the battery to the external electronic device. If the user has configured the lower bound of the SoC to be 70% by using the visual element 1030, the electronic device may limit output of power in the battery to the external electronic device or suspend the output, in response to identification of the SoC of the battery of the electronic device which is less than 70%. When the electronic device identifies the lower bound of the SoC associated with the battery of the electronic device based on the visual element 1030, the electronic device may display the predicted SoC of the battery of the external electronic device inside the UI 1010 at the timepoint when the SoC of the battery becomes lower than the lower bound of the SoC. For example, the electronic device may display the predicted SoC of the battery of the external electronic device inside the visual element 1040.

While the electronic device outputs the UI 1010 in FIG. 10, the external electronic device receiving power in the battery of the electronic device may also provide the user with a UI. An example of the UI provided to the user by the external electronic device in the situation of FIG. 10 will now be described with reference to FIGS. 11A-11B.

Figure 11A:
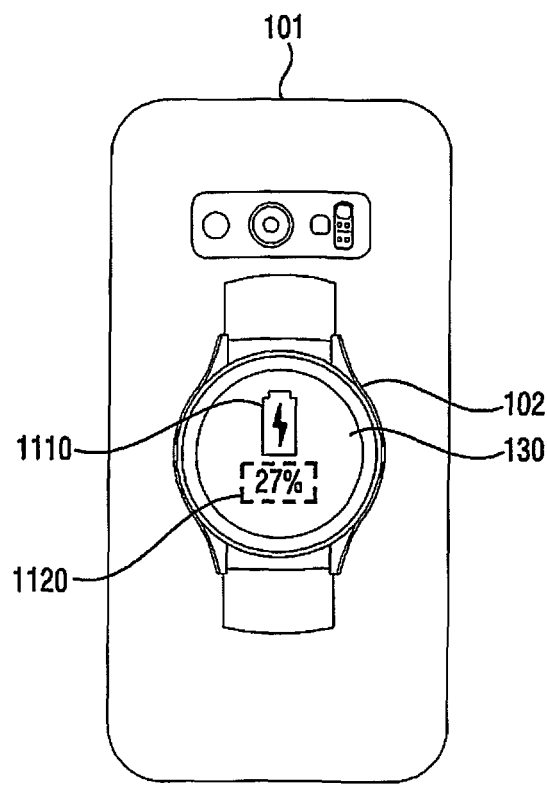
FIG. 11A is a diagram illustrating a UI displayed while an electronic device charges the battery thereof based on wirelessly received power, according to an embodiment.
Figure 11B:
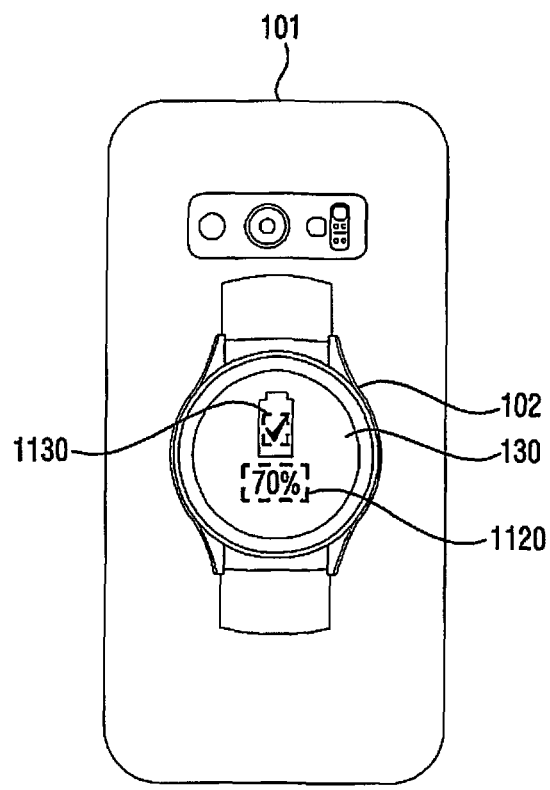
FIG. 11B is a diagram illustrating a UI displayed while an electronic device charges the battery thereof based on wirelessly received power, according to an embodiment.

FIG. 11A is a diagram illustrating a UI displayed while an electronic device 102 charges the battery thereof based on wirelessly received power, according to an embodiment. FIG. 11B is a diagram illustrating a UI displayed while an electronic device 102 charges the battery thereof based on wirelessly received power, according to an embodiment. The electronic device 101 and the electronic device 102 in FIGS. 11A-11B may correspond to the electronic device 101 and the electronic device 102 in FIG. 1 and/or FIG. 7B.

Referring to FIG. 11A, an example of a UI displayed by the electronic device 102 inside the display 130 while the electronic device 101 shares power in the battery based on step 250 in FIG. 2 and/or FIG. 9 is illustrated. While receiving power wirelessly from the electronic device 101, the electronic device 102 may display visual elements 1110 and 1120 indicating charging of the battery of the electronic device 102 inside the display 130. The visual element 1110 may indicate charging of the battery of the electronic device 102 in the type (i.e., form) of an icon, an image, an animation, and/or a video.

The visual element 1120 may include a text based on at least one parameter associated with the battery of the electronic device 102. When the text included in the visual element 1120 corresponds to the current SoC of the battery of the electronic device 102, the electronic device 102 may update the text displayed in the visual element 1120 as the battery of the electronic device 102 is wirelessly charged based on the battery of the electronic device 101.

Referring to FIG. 11B, an example of a UI displayed inside the display 130 by the electronic device 102, while the electronic device 101 has suspended sharing of power in the battery based on steps 260 and 270 in FIG. 2 and/or steps 960 and 270 in FIG. 9, is illustrated. For example, the electronic device 101 may suspend outputting power in the battery of the electronic device 101 to the electronic device 102 in response to identification of the SoC of the battery of the electronic device 102, which corresponds to the target SoC (for example, a target SoC displayed inside the visual element 1030 of FIG. 10).

The electronic device 102 may display a visual element 1130 inside the display 130 so as to inform that battery charging has been suspended in response to identification of the SoC of the battery of the electronic device 102, which corresponds to the target SoC. The visual element 1130 may notify the user that the battery of the electronic device 102 has been charged based on the target SoC, based on the type of an icon, an image, an animation, and/or a video. The electronic device 102 may output a voice signal and/or a haptic feedback such as a vibration, in response to identification of the SoC of the battery of the electronic device 102, which corresponds to the target SoC. The haptic feedback may be output together with the visual element 1130 in FIG. 11 or output independently.

At the timepoint of completion of battery charging, the current SoC of the battery displayed through the visual element 1120 may correspond to the target SoC. Since charging of the battery of the electronic device 102 has been suspended, power in the battery of the electronic device 101 may not be shared with the electronic device 102 even if the rear surface of the electronic device 101 and the rear surface of the electronic device 102 contact each other. As charging of the battery of the electronic device 102 is completed based on the target SoC, power in the battery of the electronic device 101 may not be shared with the electronic device 102 even if a wireless connection between the electronic device 101 and the electronic device 102 is maintained.

While power in the electronic device 101 is shared between the electronic device 101 and the electronic device 102, the electronic device 101 may continuously determine whether or not to share power in the electronic device 101 based on the state of the electronic device 102 and the state of the electronic device 101. For example, the electronic device 101 may continuously determine whether or not to share power in the electronic device 101 based on step 950 in FIG. 9. Hereinafter, operations of the electronic device 101 continuously determining whether or not to share power will be described in detail with reference to FIG. 12 and FIGS. 13A-13C.

Figure 12:
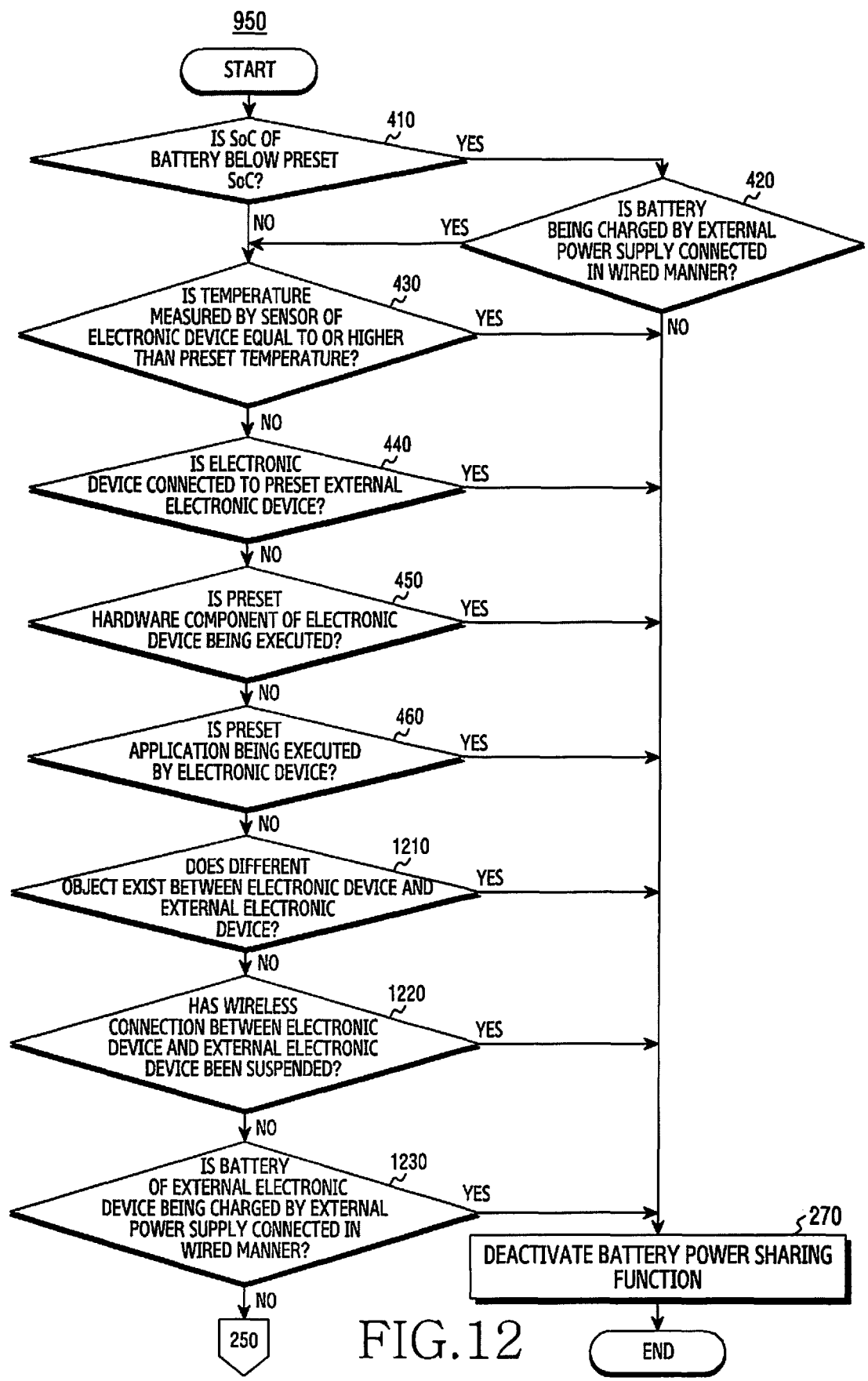
FIG. 12 is a flowchart illustrating an electronic device suspending a function of sharing battery power with an external electronic device, according to an embodiment.

FIG. 12 is a flowchart 950 illustrating an electronic device suspending a function of sharing battery power with an external electronic device, according to an embodiment. The electronic device in FIG. 12 may correspond to the electronic device 101 in FIG. 1. The operations in FIG. 12 may be performed based on the electronic device 101, the processor 110, and/or the PMIC 150 in FIG. 1. At least one of the steps in FIG. 12 may be at least partially associated with step 950 in FIG. 9, the steps in FIG. 4, and/or steps 240, 250, 260, and 270 in FIG. 2, or may be performed similarly thereto.

Referring to FIG. 12, while sharing power in the battery with an external electronic device, the electronic device may determine whether or not to share power in the battery similarly to at least one of the steps in FIG. 4. For example, in step 410, the electronic device determines whether or not the SoC of the battery is below a preset SoC. The preset SoC may include the lower bound of the SoC corresponding to the visual element 335 displayed inside the UI of FIG. 3B. While sharing power in the battery with the external electronic device, the electronic device may continuously identify the SoC of the battery. When the SoC of the battery is below the preset SoC, the electronic device may determine whether or not the battery is being charged (for example, being charged by an external power supply connected in a wired manner) in accordance with step 420. When the SoC of the battery is below the preset SoC, and when no charging occurs, the electronic device may deactivate the battery power sharing function in accordance with step 270. As the function is deactivated, output of power in the battery of the electronic device to the external electronic device may be suspended.

When the SoC of the battery is greater than or equal to the preset SoC, the electronic device may determine whether or not to deactivate the battery power sharing function based on the other conditions than the SoC-related condition, among multiple preset conditions. Referring to FIG. 12, the electronic device determines in step 430 whether or not a temperature measured by a sensor is greater than or equal to a preset temperature. When the measured temperature is greater than or equal to a preset temperature, the electronic device may suspend wirelessly outputting power in the battery to the external electronic device in accordance with step 270. The electronic device may identify a temperature measured by a sensor of the external electronic device, and may determine whether or not the identified temperature of the external electronic device is greater than or equal to a preset temperature. When the identified temperature of the external electronic device is greater than or equal to a preset temperature, the electronic device may suspend wirelessly outputting power in the battery to the external electronic device in accordance with step 270. When at least one of the temperature measured by the sensor of the electronic device and the temperature measured by the sensor of the external electronic device is greater than or equal to a preset temperature, the electronic device may suspend wirelessly outputting power in the battery to the external electronic device in accordance with step 270.

When the measured temperature is below the preset temperature, the electronic device may determine whether or not to deactivate the battery power sharing function based on the conditions other than the temperature-related condition, among multiple preset conditions. Referring to FIG. 12, the electronic device determines in step 440 whether a preset external electronic device and the electronic device are connected. The preset external electronic device may include, for example, a wireless charging dock and/or a hardware component for expanding the connectivity and/or operating mode of the electronic device. The preset external electronic device may include an electronic device based on Samsung DEX™. In addition, the preset external electronic device may include an external electronic device that can be connected to the electronic device based on an OTG connection. In response to identification of a connection between the preset external electronic device and the electronic device, the electronic device may deactivate the wireless power transmission function in accordance with step 270.

When no connection between the preset external electronic device and the electronic device is identified, the electronic device may suspend outputting power in the battery of the electronic device to the external electronic device based on the conditions other than the condition regarding the external electronic device, among multiple preset conditions. Referring to FIG. 12, the electronic device determines in step 450 whether or not a preset hardware component included in the electronic device is operating. The preset hardware component may include a hardware component consuming a relatively large amount of power. When the preset hardware component is operating, the electronic device may suspend outputting power in the battery of the electronic device to the external electronic device in accordance with step 270.

When no preset hardware component is operating inside the electronic device, the electronic device may deactivate the wireless power transmission mode based on conditions other than the condition regarding the hardware component, among multiple preset conditions. Referring to FIG. 12, the electronic device determines in step 460 whether or not a preset application is being executed by the electronic device. The preset application may include an application requiring a relatively large amount of power. The preset application may be determined heuristically based on the relation between power consumption by the battery of the electronic device and execution of the application. When the preset application is being executed, the electronic device may deactivate the wireless power transmission mode based on step 270.

When no preset application is being executed, the electronic device may deactivate the battery power sharing function based on the conditions other than the condition regarding the application, among multiple preset conditions. The multiple preset conditions may include a condition regarding the state of the external electronic device connected to the electronic device.

Referring to FIG. 12, the electronic device determines in step 1210 whether or not a different object exists between the external electronic device and the electronic device. The electronic device may identify a different object existing between the external electronic device and the electronic device at least partially based on the wireless connection between the electronic device and the external electronic device established through the communication circuit 190 in FIG. 1 and/or in-band communication between the electronic device and the external electronic device performed through the coil 165 in FIG. 1, for example. The electronic device may identify a different object existing between the external electronic device and the electronic device based on the sensitivity of radio signals transmitted/received between the external electronic device and the electronic device and/or the ratio of power wirelessly received by the external electronic device with regard to the power wirelessly output by the electronic device.

A different object may exist between the rear surface of the electronic device 101 and the rear surface of the electronic device 102 in FIGS. 7A-7B, for example. The different object may interfere with power sharing between the external electronic device and the electronic device. The different object may include a case attached to the electronic device to protect the electronic device, for example. In response to identification of the different object existing between the external electronic device and the electronic device, the electronic device may deactivate the battery power sharing function in accordance with step 270. While deactivating the battery power sharing function, the electronic device may request the user to remove the different object. If the different object is removed within a preset time after deactivation of the function, the electronic device may activate the battery power sharing function. As the battery power sharing function is activated again, charging of the battery of the external electronic device may resume.

If there is no different object between the external electronic device and the electronic device, the electronic device may suspend battery power sharing based on the conditions other than the condition regarding the different object, among multiple preset conditions. Referring to FIG. 12, the electronic device determines in step 1220 whether or not the wireless connection between the external electronic device and the electronic device has been suspended. The wireless connection may be based on Bluetooth, Wi-Fi, NFC, and/or LTE, or may be based on in-band communication. The wireless connection may be disconnected due to interference of radio signals occurring between the external electronic device and the electronic device and/or when the electronic device connects to another network. For example, when the electronic device establishes call connection to a wireless network, the wireless connection between the external electronic device and the electronic device may be disconnected.

In response to identification of suspension of the wireless connection between the external electronic device and the electronic device, the electronic device may suspend battery power sharing in accordance with step 270. If the wireless connection is re-established within a preset time after the battery power sharing is suspended, the electronic device may resume sharing power in the battery with the external electronic device. Resuming battery power sharing with the external electronic device may be performed by a user input performed on the UI displayed by the electronic device. For example, if the wireless connection is re-established within the preset time after the battery power sharing is suspended, the electronic device may display a UI for resuming battery power sharing to the user. At least partially based on the user input performed inside the UI (i.e., when the user uses the UI to input information), the electronic device may resume battery power sharing with the external electronic device.

When the wireless connection between the electronic device and the external electronic device is not suspended, the electronic device may deactivate the battery power sharing function based on the conditions other than the condition regarding the wireless connection, among multiple preset conditions. Referring to FIG. 12, the electronic device determines in step 1230 whether or not the battery of the external electronic device is being charged by an external power supply (for example, a TA) connected in a wired manner. For example, while the electronic device transmits power in the battery to the external electronic device, the user of the external electronic device may connect an external power supply to the external electronic device. In response to identifying reception of power from the external power supply, the external electronic device may notify the electronic device that power is received from the external power supply. The external electronic device may charge the battery of the external electronic device based on power received from the external power supply.

In response to identifying that the battery of the external electronic device is charged by the external power supply, the electronic device may deactivate the battery power sharing function in accordance with step 270. In spite of deactivation of the battery power sharing function in accordance with step 270, the electronic device may maintain the wireless connection between the external electronic device and the electronic device.

When the battery of the external electronic device is not being charged by the external power supply, the electronic device may determine whether or not the conditions (i.e., among multiple preset conditions), other than the condition regarding the external power supply, are satisfied. Referring to FIG. 12, when it is confirmed as a result of assessing all of the multiple conditions based on steps 410, 420, 430, 440, 450, 460, 1210, 1220, and 1230 that all of the conditions are satisfied, the electronic device may output power in the battery to the external electronic device in accordance with step 250 in FIG. 2 and/or FIG. 9, or may keep outputting power in the battery. The order to which the electronic device assesses the multiple conditions is not limited to the order of steps 410, 420, 430, 440, 450, 460, 1210, 1220, and 1230 illustrated in FIG. 12. For example, the electronic device may assess the multiple conditions in a different order from the order in FIG. 12 and/or may simultaneously assess at least some of the multiple conditions. The type and/or number of conditions assessed by the electronic device to maintain battery power output are not limited to FIG. 12, and may vary depending on the embodiment.

When deactivating the battery power sharing function in accordance with step 270, the electronic device may display a UI to the user so as to indicate the specific condition, among the multiple preset conditions, serving as a basis to deactivate the function. If all of the conditions are again satisfied within a preset time (for example, time for which the UI is displayed) after deactivating the battery power sharing function in accordance with step 270, the electronic device according to an embodiment may resume battery power sharing. The UI may be based on an ongoing notification and/or a popup window. The UI displayed to the user by the electronic device in accordance with step 270 will be described in detail with reference to FIGS. 13A-13C.

Figure 13A:
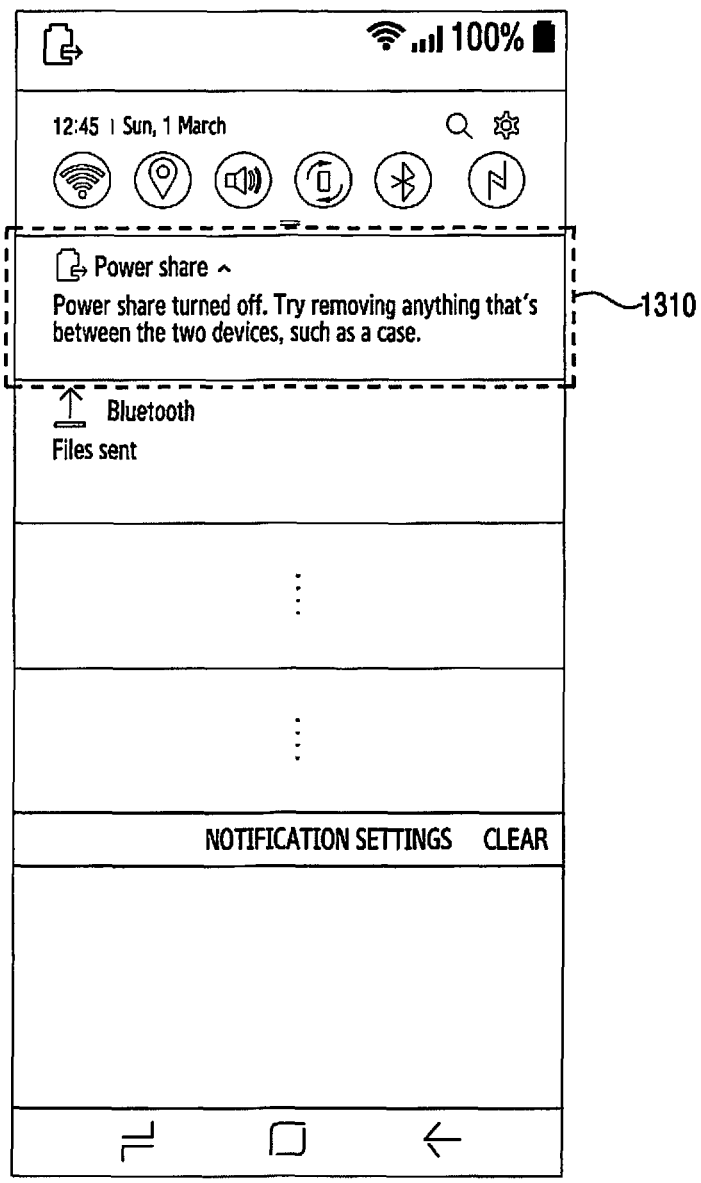
FIG. 13A is a diagram illustrating a UI displayed when an electronic device suspends a function of sharing battery power with an external electronic device, according to an embodiment.
Figure 13B:
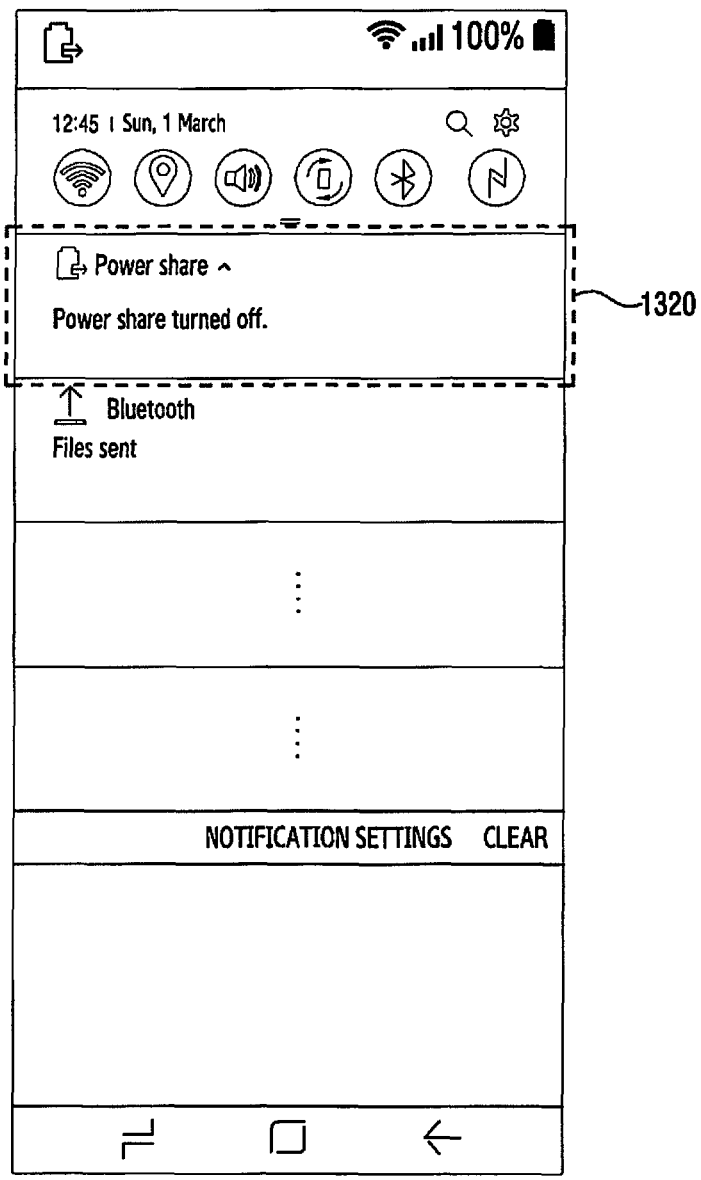
FIG. 13B is a diagram illustrating a UI displayed when an electronic device suspends a function of sharing battery power with an external electronic device, according to an embodiment.
Figure 13C:
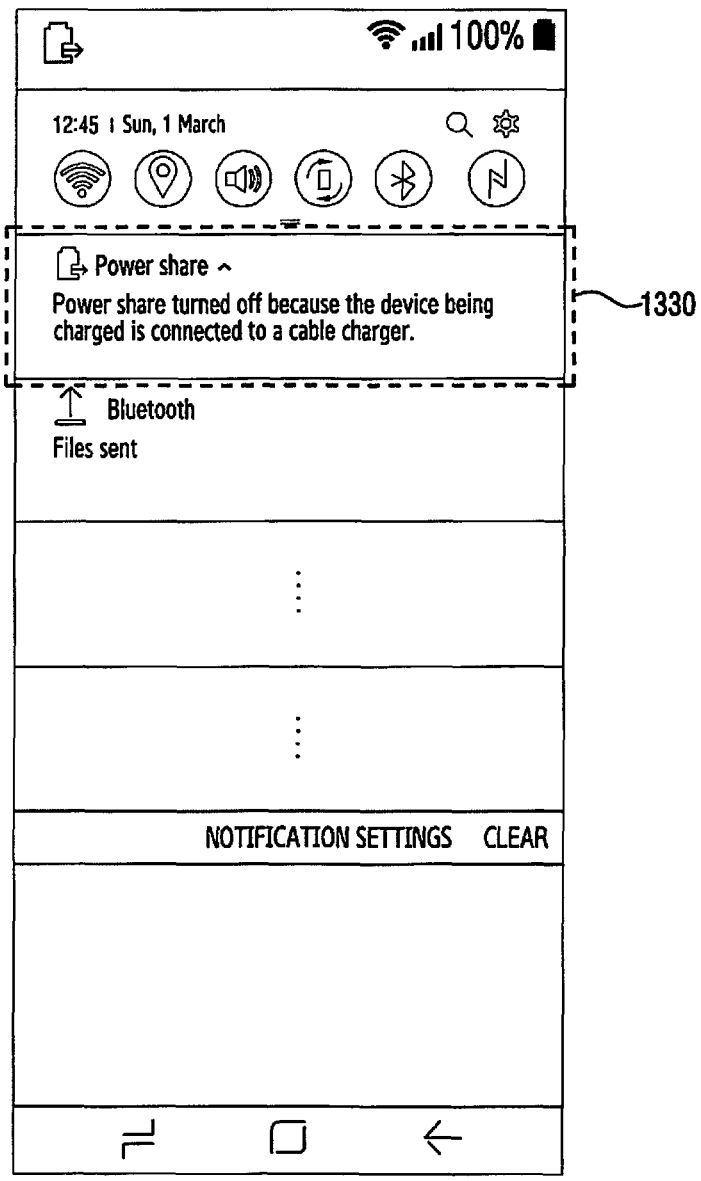
FIG. 13C is a diagram illustrating a UI displayed when an electronic device suspends a function of sharing battery power with an external electronic device, according to an embodiment.

FIG. 13A is a diagram illustrating a UI 1310 displayed when an electronic device suspends a function of sharing battery power with an external electronic device, according to an embodiment. FIG. 13B is a diagram illustrating a UI 1320 displayed when an electronic device suspends a function of sharing battery power with an external electronic device, according to an embodiment. FIG. 13C is a diagram illustrating a UI 1330 displayed when an electronic device suspends a function of sharing battery power with an external electronic device. The electronic device in FIGS. 13A-13C may correspond to the electronic device 101 in FIG. 1. Operations in FIGS. 13A-13C may be at least partially associated with step 270 in FIG. 2 and/or FIG. 9 and/or the steps in FIG. 12.

Referring to FIGS. 13A-13C, a UI displayed inside (i.e., on) the display 130 of the electronic device is illustrated. The UI in FIGS. 13A-13C may be at least partially associated with the UI 850 in FIG. 8C. If battery power sharing is deactivated based on FIG. 12 while the electronic device is displaying the UI 850 in FIG. 8C, the electronic device may output a message indicating deactivation of battery power sharing, as in the case of the UIs 1310, 1320, and 1330 in FIGS. 13A-13C, inside the notification center.

If a different object is identified between the external electronic device and the electronic device in accordance with step 1210 in FIG. 12, the electronic device may display a text message indicating identification of a different object as in the case of the UI 1310 in FIG. 13A. The text message may include a text message indicating deactivation of the battery power sharing function and/or the wireless power transmission mode. The text message may include a message for guiding removal of the different object. If the user removes the different object while the UI 1310 is displayed and/or within a preset time, the electronic device may re-activate the battery power sharing function and/or the wireless power transmission mode.

If the battery power sharing function is deactivated in accordance with step 270 in FIG. 12, the electronic device may display a text message indicating deactivation of the function as in the case of the UI 1320 in FIG. 13B. If the user does not remove the different object within a preset time despite the display of the UI 1310 in FIG. 13A, the electronic device may display a text message indicating deactivation of the function as in the case of the UI 1320.

Upon identifying an external power supply for charging the battery of the external electronic device in accordance with step 1230 in FIG. 12, the electronic device displays a text message indicating that sharing of power in the battery of the electronic device has been suspended, as in the case of the UI 1330 in FIG. 13C. The UI 1330 may include a text message indicating connection between the external electronic device and the external power supply distinguished from the electronic device. If the user separates the external electronic device and the external power supply while the UI 1330 is displayed, the electronic device may resume battery power sharing. If battery power sharing is resumed, then the electronic device may re-display the UI 850 of FIG. 8C inside the notification center.

The electronic device may display a visual element corresponding to a condition to suspend battery power sharing inside the display, as in the case of the UIs 1310, 1320, and 1330. The visual element may include a text message, an image, an icon, an animation, and/or a video. The electronic device may output a haptic feedback such as a vibration and/or a voice signal while displaying the UIs 1310, 1320, and 1330. The type of the UI output by the electronic device may vary depending on whether or not the mute mode and/or the vibration mode of the electronic device are activated.

The electronic device may display a visual element associated with a condition to suspend battery power sharing inside the display, based on Table 2, below. The condition may be identified based on the operations in FIG. 12, for example. The visual element may be displayed inside the notification center as in the case of the UIs 1310, 1320, and 1330.

TABLE 2

| State | Text message included in visual element |
|---|---|
| Battery SoC < preset SoC and TA not connected | Power share turned off. Charge the battery to at least 30% to share power again. |
| Temperature of battery of electronic device > preset temperature | Power share turned off. Try again when your phone cools down. |
| Temperature of battery of external electronic device > preset temperature | Power share turned off. Try again when another phone cools down. |
| Connection between external electronic device and electronic device based on OTG connection | Power share turned off because a cable was connected to your phone. |
| Connection between preset external electronic device (external electronic device based on Samsung DEX ™) and electronic device | Power share turned off. You can't share power while using Samsung DEX ™. |
| State in which preset hardware component (camera) operates | Power share turned off. You can't share power while using the camera. |
| Wireless connection between electronic device and external electronic device suspended | Power share turned off. Please connect the device being charged in 2 minutes. |
| Wireless connection between electronic device and external electronic device suspended (call connection) | Power share turned off. You can't share power while making a call. |

Referring to Table 2, a text message may provide the user with a condition that needs to be satisfied to resume power sharing. For example, if the user charges the battery such that the SoC of the battery becomes greater than or equal to 30%, the electronic device may re-activate the function of charging the battery of the external electronic device. If the user cools down the battery and/or the electronic device, the electronic device may resume wireless transmission of power in the battery. If the user cools down the external electronic device, the electronic device may resume wireless transmission of power in the battery. If the user wirelessly connects the external electronic device and the electronic device (for example, establishes a Bluetooth connection, or brings the rear surface of the electronic device and the rear surface of the external electronic device into contact) within a preset time (for example, two minutes), the electronic device may resume output of power in the battery to the external electronic device. If the user ends a telephone call, the electronic device may re-activate the wireless power transmission mode.

Referring to FIGS. 7A-13, operations performed when the electronic device has successfully identified an external electronic device are described. Hereinafter, operations performed when the electronic device has identified no external electronic device will be described in detail with reference to FIGS. 14-15.

Figure 14:
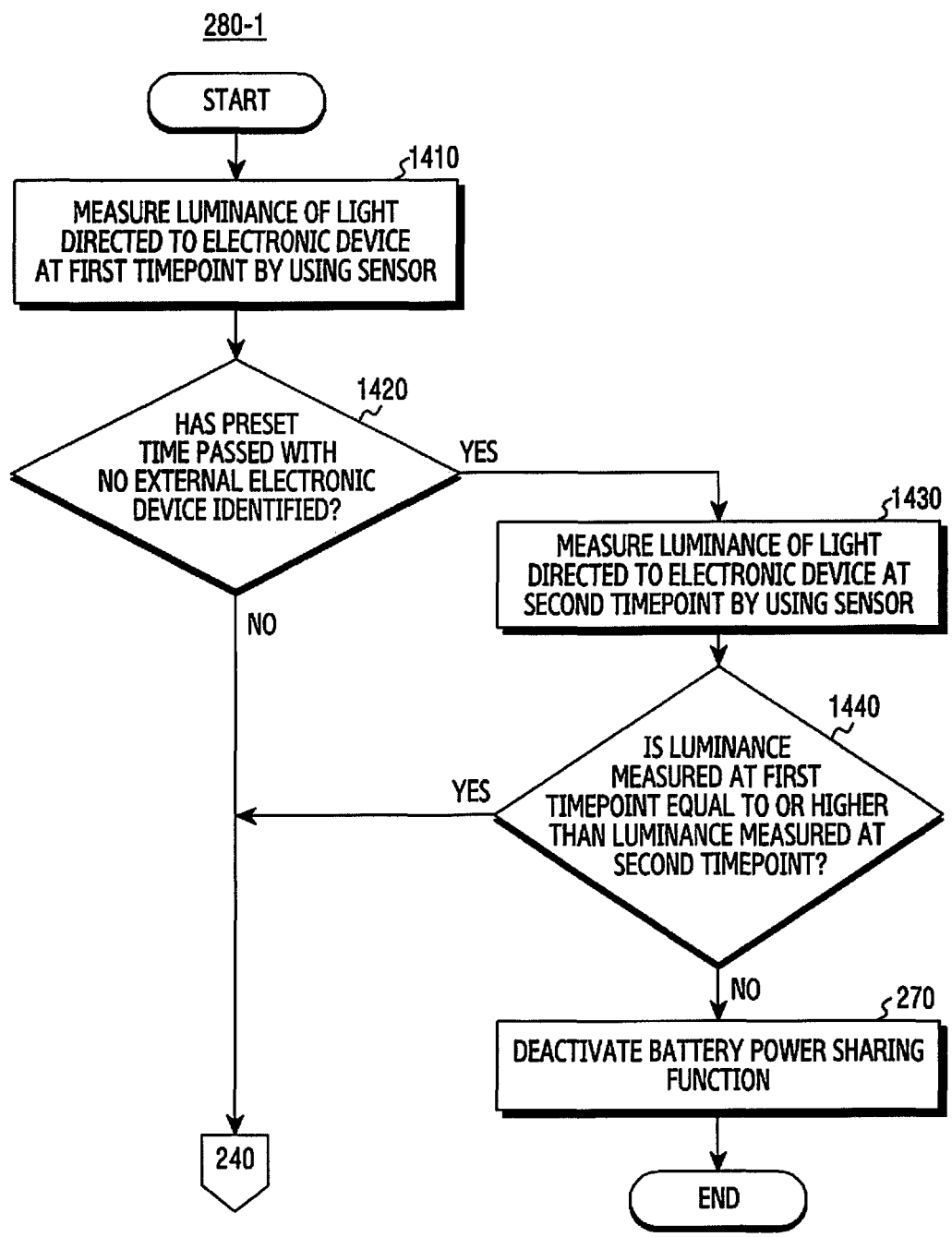
FIG. 14 is a flowchart illustrating an electronic device maintaining activation of a battery power sharing function based on a luminance measured by a sensor, according to an embodiment.

FIG. 14 is a flowchart 280-1 illustrating an electronic device maintaining activation of a battery power sharing function based on a luminance measured by a sensor, according to an embodiment. The electronic device in FIG. 14 may correspond to the electronic device 101 in FIG. 1.

The operations in FIG. 14 may be performed based on the electronic device 101, the processor 110, and/or the PMIC 150 in FIG. 1. At least one of the steps in FIG. 14 may be at least partially associated with step 280 in FIG. 2. For example, when no external electronic device has been identified for a preset time in accordance with step 240, the electronic device may determine whether or not to deactivate the battery power sharing function based on at least one of the steps in FIG. 14.

Referring to FIG. 14, in step 1410, the electronic device measures the luminance of light directed to the electronic device at a first timepoint by using a sensor. The first timepoint may correspond to a timepoint at which the battery power sharing function is activated in accordance with steps 220 and 230 in FIG. 2. The first timepoint may corresponds to a timepoint at which the user input in step 210 is received. The luminance of light directed to the electronic device may be measured using the luminance sensor 171 in FIG. 1. The electronic device may identify the luminance measured at the first timepoint.

Referring to FIG. 14, in step 1420, the electronic device determines whether or not a preset time has passed with no external electronic device identified. The electronic device may determine whether or not a preset time has passed in accordance with step 1420 while identifying an external electronic device in accordance with step 240 in FIG. 2. When an external electronic device has been identified within the preset time, the electronic device may output power in the battery thereof to the external electronic device at least partially in accordance with steps 240 and 250 in FIG. 2. Identification of the external electronic device may be performed based on the communication circuit 190.

In response to identifying that the preset time has passed with no external electronic device identified, the electronic device measures the luminance of light directed to the electronic device at a second timepoint by using a sensor in step 1430. The sensor may correspond to the luminance sensor 171 in FIG. 1, for example. The second timepoint may correspond to a timepoint which is distinguished from the first timepoint, and at which the preset time has passed. The difference between the first timepoint and the second timepoint may correspond to the preset time for identifying an external electronic device.

Referring to FIG. 14, in step 1440, the electronic device compares the luminance measured at the first timepoint and the luminance measured at the second timepoint. For example, the electronic device may determine whether or not the luminance measured at the first timepoint is greater than or equal to the luminance measured at the second timepoint. The electronic device may identify the posture of the electronic device based on the luminance measured at the first timepoint and the luminance measured at the second timepoint. The identified posture of the electronic device may be used to determine whether or not to maintain activation of the battery power sharing function.

For example, after performing a user input of activating the battery power sharing function, the user may lay down the electronic device such that a surface of the housing of the electronic device, on which the display and/or the sensor (for example, the luminance sensor 171 in FIG. 1) are disposed, faces the ground. In this case, since the sensor of the electronic device faces the ground at the second timepoint, luminance measured at the first timepoint may be greater than or equal to luminance measured at the second timepoint. When the luminance measured at the first timepoint is greater than or equal to luminance measured at the second timepoint, the electronic device may keep identifying an external electronic device in accordance with step 240 in FIG. 2. In response to identifying that the luminance measured at the second timepoint is below the luminance measured at the first timepoint, the electronic device may identify a wireless connection between the external electronic device and the electronic device by maintaining activation of the battery power sharing function.

The electronic device may keep identifying an external electronic device after the user has laid down the electronic device such that a surface of the housing of the electronic device, on which the display and/or the sensor are disposed, faces the ground. The electronic device may identify an external electronic device even if a preset time has passed after the user has laid down the electronic device such that a surface of the housing of the electronic device, on which the display and/or the sensor are disposed, faces the ground. When the rear surface of the electronic device and the rear surface of the external electronic device contact each other, the electronic device may output power in the battery to the external electronic device in response to identification of the external electronic device.

When the luminance measured at the first timepoint is less than or equal to the luminance measured at the second timepoint, the electronic device may deactivate the battery power sharing function in accordance with step 270. The electronic device may deactivate the battery power sharing function at least partially based on the difference between the luminance measured at the first timepoint and the luminance measured at the second timepoint. For example, if the user keeps holding the electronic device after the user has provided input in step 210 in FIG. 2, the difference between the luminance measured at the first timepoint and the luminance measured at the second timepoint may lie within a preset range, or the luminance measured at the second timepoint may exceed the luminance measured at the first timepoint. In response to identifying the difference between the luminance measured at the first timepoint and the luminance measured at the second timepoint within the preset range, the electronic device may suspend identification of connection between the external electronic device and the electronic device, thereby deactivating the battery power sharing function.

Referring to FIG. 14, if no external electronic device has been identified for a preset time after a user input for activating the battery power sharing function, or if charging of the battery of the external electronic device has not begun, and if it is confirmed that the posture of the electronic device and/or the luminance measured at the electronic device is improper to maintain activation of the function, then the electronic device deactivates the function in step 270. For example, if the luminance measured at the electronic device has increased before/after receiving the user input, the electronic device may deactivate the function. This is because the luminance may increase if the user maintains the electronic device in a posture inappropriate for battery power sharing. After deactivating the function, the electronic device may charge the battery based on wirelessly received power.

The electronic device may determine whether or not the user is maintaining the electronic device in a posture inappropriate for battery power sharing, based on the luminance and/or movement.

Figure 15:
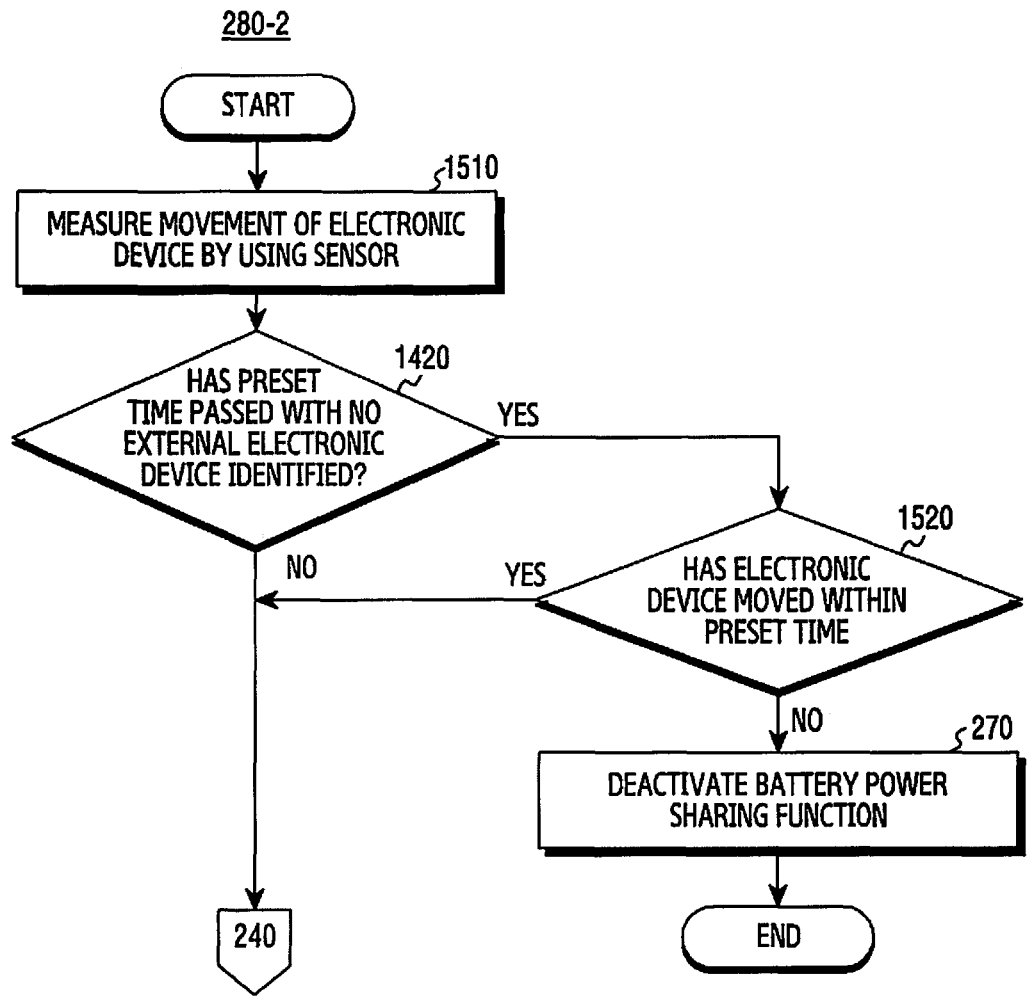
FIG. 15 is a flowchart illustrating an electronic device maintaining activation of a battery power sharing function based on a movement of the electronic device measured by a sensor, according to an embodiment.

FIG. 15 is a flowchart 280-2 illustrating an electronic device maintaining activation of a battery power sharing function based on a movement of the electronic device measured by a sensor, according to an embodiment. The electronic device in FIG. 15 may correspond to the electronic device 101 in FIG. 1. The operations in FIG. 15 may be performed based on the electronic device 101, the processor 110, and/or the PMIC 150 in FIG. 1. At least one of the steps in FIG. 15 may be at least partially associated with step 280 in FIG. 2. For example, when no external electronic device has been identified for a preset time based on step 240, the electronic device may determine whether or not to deactivate the battery power sharing function based on at least one of the steps in FIG. 15.

Referring to FIG. 15, in step 1510, the electronic device measures the movement of the electronic device by using a sensor. The sensor may be a motion sensor corresponding to at least one of an acceleration sensor, a gyro sensor, and/or a gravity sensor, for example. The electronic device may perform step 1510 after activation of the battery power sharing function in accordance with steps 220 and 230 in FIG. 2.

Referring to FIG. 15, in step 1420, the electronic device determines whether or not a preset time has passed with no external electronic device identified. Step 1420 in FIG. 15 is similar to step 1420 in FIG. 14. The electronic device may keep measuring the movement of the electronic device in accordance with step 1510 while identifying an external electronic device in accordance with step 240 in FIG. 2. The electronic device may acquire the movement of the electronic device from the sensor for the preset time to identify an external electronic device.

When the preset time has passed with no external electronic device being identified, the electronic device determines in step 1520 whether or not the electronic device has moved within the preset time. The electronic device may determine whether or not the electronic device has moved within the preset time at least partially based on data acquired from the sensor within the preset time. The electronic device may deactivate the battery power sharing function based on whether or not a movement of the electronic device has been measured after the user input provided in step 210 of FIG. 2 has been received.

When the electronic device has moved within the preset time, the electronic device may deactivate the battery power sharing function in accordance with step 270. For example, the electronic device may deactivate the wireless power transmission mode when the electronic device has been moved by the user while identifying an external electronic device. After the wireless power transmission mode is deactivated, the electronic device may charge the battery based on wirelessly received power.

When the electronic device has not moved within the preset time, the electronic device may keep identifying an external electronic device in accordance with step 240 in FIG. 2. For example, when the user has laid down the electronic device such that a surface of the housing of the electronic device (for example, the front surface on which the display and/or the luminance sensor are disposed) faces the ground, the electronic device may not move within the preset time. In this case, the electronic device may keep identifying an external electronic device in accordance with step 240 in FIG. 2.

Referring to FIGS. 14-15, operations performed when the electronic device has identified no external electronic device are described. Hereinafter, operations of the electronic device requesting an external electronic device to transmit power, after identifying the external electronic device, will be described in detail with reference to FIGS. 16-17.

Figure 16:
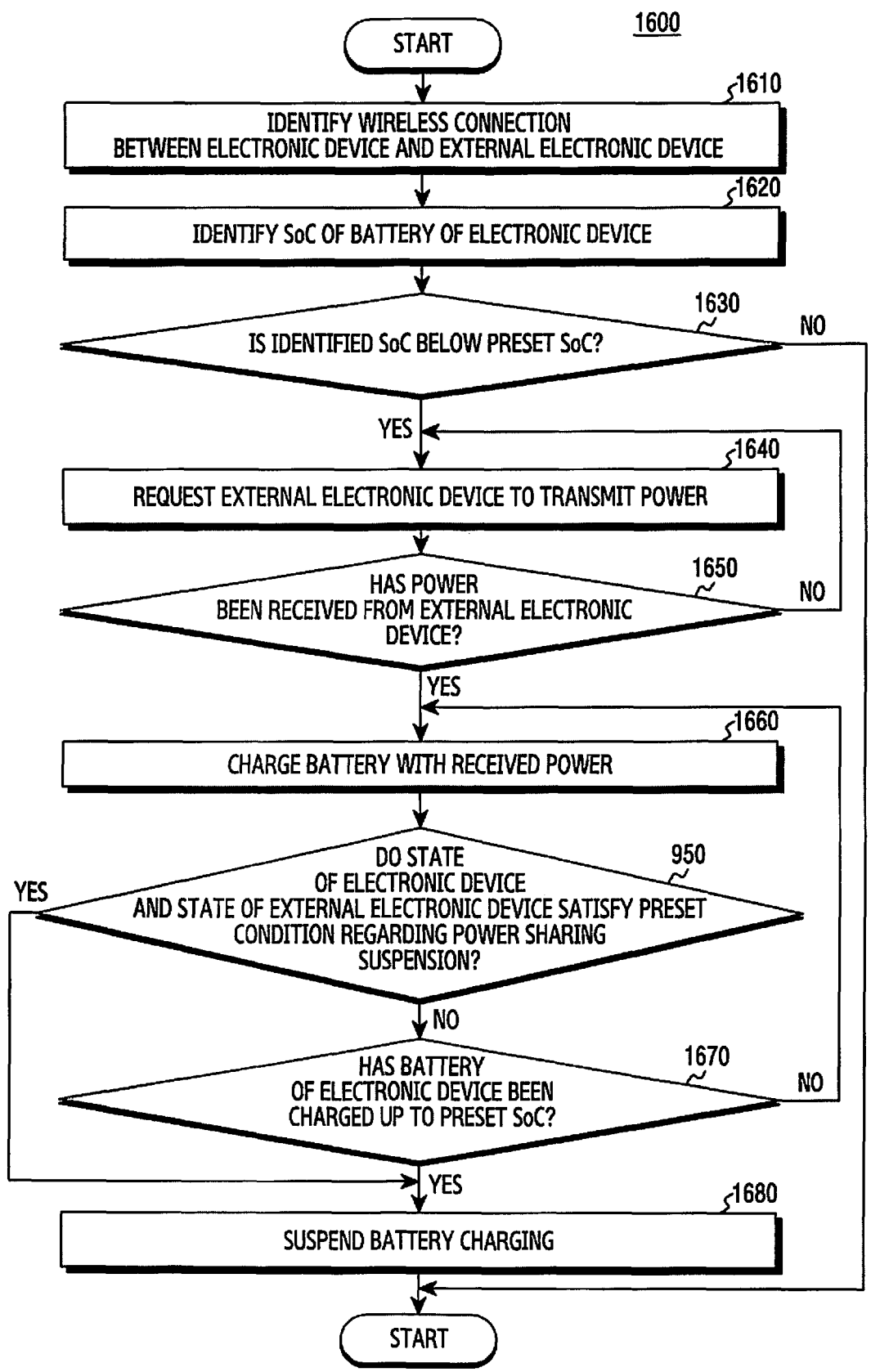
FIG. 16 is a flowchart illustrating an electronic device requesting an external electronic device to transmit power, according to an embodiment.

FIG. 16 is a flowchart 1600 illustrating an electronic device requesting an external electronic device to transmit power, according to an embodiment. The electronic device in FIG. 16 may correspond to the electronic device 102 in FIG. 1, and the external electronic device in FIG. 16 may correspond to the electronic device 101 in FIG. 1. The operations in FIG. 16 may be performed based on the electronic device 101, the processor 110, and/or the PMIC 150 in FIG. 1.

Referring to FIG. 16, in step 1610, the electronic device identifies a wireless connection between the external electronic device and the electronic device. The wireless connection may be based on at least one of out-of-band communication and in-band communication, such as NFC, Bluetooth, Wi-Fi, and/or LTE. The wireless connection may be established by the communication circuit 190. When the user brings the rear surface of the electronic device and the rear surface of the external electronic device into contact, a wireless connection may be established between the electronic device and the external electronic device. The electronic device may identify establishment of the wireless connection resulting from the contact between the rear surfaces.

In response to identifying the wireless connection between the electronic device and the external electronic device, the electronic device identifies the SoC of the battery included in the electronic device in step 1620. The SoC may correspond to the SoC of the battery measured at the timepoint of identification of the wireless connection. Referring to FIG. 16, in step 1630, the electronic device determines whether or not the SoC identified in step 1620 is below a preset SoC. The preset SoC may correspond to a threshold SoC that requires battery charging. For example, the preset SoC may correspond to a threshold SoC that activates a power saving mode. For example, the preset SoC may be 30%.

When the identified SoC is below the preset SoC, the electronic device requests the external electronic device to transmit power in step 1640. The electronic device may transmit a signal including the request to the external electronic device through the wireless connection between the external electronic device and the electronic device identified in step 1610. The request in step 1640 may be performed by a user input. An embodiment of step 1640 performed by the electronic device based on a user input will be described in detail with reference to FIG. 17.

After receiving the signal, the external electronic device may activate a function for wirelessly transmitting power in the battery of the external electronic device in accordance with step 220 in FIG. 2, for example. After activating the function, the external electronic device may wirelessly transmit power in the battery to the electronic device. While wirelessly transmitting power in the battery, the external electronic device may display at least one of the UIs 810, 840, and 870 in FIGS. 8A-8C.

After receiving the power transmission request from the external electronic device, the electronic device determines whether or not power has been received from the external electronic device in step 1650. When power is received from the external electronic device, the electronic device charges the battery by using the received power in step 1660. While charging the battery by using the power received from the external electronic device, the electronic device and/or the external electronic device may display a UI associated with battery power sharing. The UI may include both a parameter associated with the battery of the electronic device and a parameter associated with the battery of the external electronic device, as in the case of the UI 1010 in FIG. 10.

Referring to FIG. 16, in step 950, the electronic device determines whether or not the state of the external electronic device and that of the electronic device satisfy a preset condition regarding power sharing suspension. Step 950 in FIG. 16 is similar to step 950 in FIG. 9. For example, the electronic device may assess multiple conditions regarding the state (i.e., temperature, SoC, and current) of the battery that is being charged in accordance with step 1660, the state (i.e., temperature, SoC, current) of the battery of the external electronic device that wirelessly transmits power, and the power transmission environment (i.e., existence of an obstacle or wireless connection suspension) between the external electronic device and the electronic device. When power sharing is suspended based on at least one of the conditions, the electronic device may display a UI indicating power sharing suspension, similar to FIGS. 13A-13C.

When the state of the electronic device and that of the external electronic device do not satisfy the preset condition regarding power sharing suspension, the electronic device determines in step 1670 whether or not the battery included in the electronic device has been charged up to the preset SoC. The preset SoC may be a parameter which is distinguished from the SoC in step 1620, and which may refer to a target SoC corresponding to the visual element 345 in FIG. 3C, for example. As battery charging is maintained in accordance with step 1660 while the preset condition regarding power sharing suspension is not satisfied, the SoC of the battery of the electronic device may gradually increase to the target SoC.

When the battery of the electronic device has been charged up to the preset SoC, the electronic device suspends battery charging in step 1680. The electronic device may transmit a signal indicating battery charging suspension to the external electronic device. Referring to FIG. 16, when the preset condition regarding the power sharing suspension is satisfied, or when the battery has been charged up to the preset SoC in step 1670, the electronic device may suspend battery charging based on the wirelessly received power.

Figure 17:
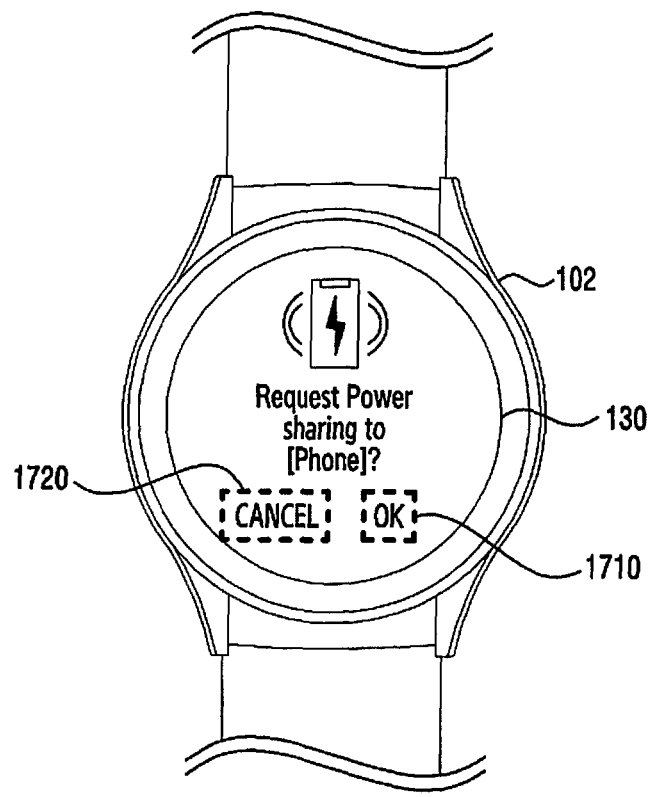
FIG. 17 is a diagram illustrating a UI displayed by an electronic device to request an external electronic device to transmit power.

FIG. 17 is a diagram illustrating a UI displayed by an electronic device 102 to request an external electronic device to transmit power, according to an embodiment. The electronic device 102 in FIG. 17 may correspond to the electronic device 102 in FIG. 1. The UI in FIG. 17 may be associated with step 1640 in FIG. 16.

Referring to FIG. 17, in response to identification of the SoC of the battery of the electronic device 102, which is below a preset SoC, while the electronic device 102 is wirelessly connected to an external electronic device (for example, electronic device 101 in FIG. 1), the electronic device 102 may display a UI in the display 130 for requesting the external electronic device to transmit power. Referring to FIG. 17, the UI may include a text message asking whether or not to request the external electronic device to transmit power, and the UI may display visual elements 1710 and 1720 for receiving a confirmation regarding the request from the user. The visual elements 1710 and 1720 may be a type of button that includes a text message regarding confirmation of the request (for example, "OK" and/or "Cancel").

If the user touches the visual element 1720 to reject the request, the electronic device 102 may not request the external electronic device to transmit power. If the user touches the visual element 1710 to confirm the request, the electronic device 102 may request the external electronic device to transmit power in accordance with step 1640 in FIG. 16. In response to receiving power from the external electronic device, the electronic device 102 may display a UI on the display 130 associated with power reception and/or battery charging as in FIG. 11A, for example.

The electronic device may share power in the battery with the identified external electronic device through a wireless connection. The sharing may be performed based on at least one parameter input through a UI displayed inside the display of the electronic device and/or the external electronic device. The at least one parameter may include a lower bound of an SoC, which is a reference for limiting power sharing, and a target SoC, which is a reference for completing power sharing. While sharing power in the battery, the electronic device and/or the external electronic device may determine whether or not the current state is appropriate for battery power sharing based on various conditions. While identifying an external electronic device in response to activation of the power sharing function, the electronic device may determine whether or not the state of the electronic device is appropriate for identifying an external electronic device by using a luminance sensor and/or a motion sensor. When the state of the electronic device corresponds to a state that is not appropriate for identifying an external electronic device, the electronic device may deactivate the power sharing function.

According to various embodiments, an electronic device may include a first battery; a coil; a communication circuit; a display; a memory; and at least one processor operably coupled to the first battery, the coil, the communication circuit, the display, and the memory, wherein the memory includes configured to cause, while being executed, the at least processor to identify a first user input for activating a function of sharing power in the first battery; display a UI indicating that the function has been activated on the display, based on the identification of the first user input; identify an external electronic device distinguished from the electronic device by using the communication circuit, while the UI is displayed; display a visual element indicating information regarding a second battery included in the identified external electronic device inside the UI, based on the identification of the external electronic device; and output power in the first battery to the identified external electronic device through the coil, at least partially based on a second user input regarding the visual element.

The multiple instructions may further be configured to cause, while being executed, the at least one processor to: identify information including an SoC of the second battery, based on the identification of the external electronic device; and display a second visual element regarding the SoC on the UI, based on the identification of the information including the SoC.

The multiple instructions may further be configured to cause, while being executed, the at least one processor to output power in the first battery to the external electronic device through the coil in a state in which the SoC of the second battery is less than or equal to an SoC displayed by the visual element; and suspend outputting power in the first battery to the external electronic device through the coil in a state in which the SoC of the second battery exceeds the SoC displayed by the visual element.

The multiple instructions may further be configured to cause, while being executed, the at least one processor to identify a change in an SoC of the first battery in a state in which charging of the second battery is completed, based on an SoC displayed by the visual element, based on the identification of the external electronic device; and display a second visual element indicating the identified change in the SoC inside the UI, based on the identification of the change in the SoC of the first battery.

The multiple instructions may further be configured to cause, while being executed, the at least one processor to identify an SoC of the first battery, based on the identification of the first user input; display the UI indicating activation of the function, based on the identification of the SoC being greater than or equal to a preset SoC from the first battery; and display a second UI indicating deactivation of the function, based on the identification of the SoC being below the preset SoC from the first battery.

The multiple instructions may further be configured to cause, while being executed, the at least one processor to limit activation of the function of sharing power and display of the UI in a state in which a current for charging the battery is received wirelessly.

The electronic device may further include a sensor configured to measure luminance of light directed to a first surface of a housing of the electronic device, and the multiple instructions may further be configured to cause, while being executed, the at least one processor to measure a first luminance corresponding to a timepoint of the identification of the first user input based on the sensor; identify the external electronic device by using the communication circuit for a preset time after the identification of the first user input; measure a second luminance corresponding to a timepoint distinguished from the first luminance based on the sensor, based on identifying that the external electronic device has not been connected through the communication circuit for the preset time; and deactivate the function of sharing power in the first battery, at least partially based on a difference between the first luminance and the second luminance.

The electronic device may further include a sensor configured to measure a movement of the electronic device, and the multiple instructions may further be configured to cause, while being executed, the at least one processor to: measure the movement of the electronic device by using the sensor, after identification of the first user input; and deactivate the function of sharing power in the first battery, at least partially based on whether or not the movement of the electronic device has been measured after the identification of the first user input.

According to various embodiments, an electronic device may include a first battery; a coil; a display; at least one sensor; a memory; and at least one processor operably coupled to the first battery, the coil, the display, the at least one sensor, and the memory, wherein the memory is configured to store multiple instructions configured to cause, while being executed, the at least one processor to: identify a user input for activating a function of sharing power in the first battery based on the coil; measure a first luminance of light directed to the at least one sensor in response to activation of the function based on the identified user input; identify a connection between the electronic device and an external electronic device for receiving power in the first battery for a preset time after activation of the function; measure a second luminance of light directed to the at least one sensor in response to identifying that the connection is not established in the present time; and deactivate the function of sharing power in the first battery, at least partially based on the first luminance and the second luminance.

The multiple instructions may further be configured to cause, while being executed, the at least one processor to identify a connection between the external electronic device and the electronic device by maintaining activation of the function in response to identifying that the second luminance is lower than the first luminance; and deactivate the function by suspending identification of the connection between the external electronic device and the electronic device in response to identifying a difference between the first luminance and the second luminance within a preset range.

The multiple instructions may further be configured to cause, while being executed, the at least one processor to identify an SoC of the first battery, based on the identification of the first user input; and display a message requesting charging of the first battery to a user, based on the identification of the SoC being lower than a preset SoC.

The electronic device may further include a communication circuit, and the multiple instructions may further be configured to cause, while being executed, the at least one processor to identify an SoC of a second battery included in the external electronic device in response to identifying the connection between the external electronic device and the electronic device established by using the communication circuit within the preset time; and output power in the first battery to the external electronic device through the coil, based on the SoC of the second battery and at least one parameter associated with the function that has been input by a user.

The multiple instructions may further be configured to cause, while being executed, the at least one processor to output power in the first battery to the external electronic device through the coil in a state in which the SoC of the second battery is less than or equal to a target SoC input by the user; and limit output of power in the first battery through the coil in a state in which the SoC of the second battery exceeds the target SoC.

The multiple instructions may further be configured to cause, while being executed, the at least one processor to identify whether or not a function of sharing power in the second battery has been activated by the external electronic device in response to identifying the connection between the external electronic device and the electronic device established by using the communication circuit within the preset time; request the external electronic device to deactivate the function of sharing power in the second battery by using the communication circuit in response to identifying that the function of sharing power in the second battery has been activated by the external electronic device; and initiate output of power in the first battery to the external electronic device through the coil in response to identifying deactivation of the function of sharing power in the second battery by the external electronic device.

The at least one sensor may include a luminance sensor disposed on a first surface of a housing of the electronic device, on which the display is disposed, so as to measure luminance of light directed to the first surface, and the multiple instructions may further be configured to cause, while being executed, the at least one processor to measure the first luminance and the second luminance by using the luminance sensor.

According to various embodiments, an electronic device may include a first battery; a coil; a display; at least one sensor; a memory; and at least one processor operably coupled to the first battery, the coil, the display, the at least one sensor, and the memory, wherein the memory is configured to store multiple instructions configured to cause, while being executed, the at least processor to identify a user input for activating a function of sharing power in the first battery based on the coil; identify a connection between the electronic device and an external electronic device for receiving power in the first battery for a preset time in response to activation of the function based on the identified user input; acquire data regarding a movement of the electronic device measured by using the at least one sensor for the preset time; identify the movement of the electronic device measured within the present time based on the data in response to identifying that the connection is not established in the preset time; and deactivate the function of sharing power in the first battery in response to identifying the movement of the electronic device measured within the preset time.

The multiple instructions may further be configured to cause, while being executed, the at least one processor to identify the connection between the external electronic device and the electronic device by maintaining activation of the function in response to identifying, from the data, that the electronic device has not moved within the preset time.

The electronic device may further include a communication circuit, and the multiple instructions may further be configured to cause, while being executed, the at least one processor to identify an SoC of a second battery included in the external electronic device in response to identifying the connection between the external electronic device and the electronic device established by using the communication circuit within the preset time; and output power in the first battery to the external electronic device through the coil, based on the SoC of the second battery and at least one parameter associated with the function that has been input by a user.

The multiple instructions may further be configured to cause, while being executed, the at least one processor to output power in the first battery to the external electronic device through the coil in a state in which the SoC of the second battery is less than or equal to a target SoC input by the user; and limit output of power in the first battery in a state in which the SoC of the second battery exceeds the target SoC.

The multiple instructions may further be configured to cause, while being executed, the at least one processor to: display a UI associated with the at least one parameter in response to activation of the function based on the identified user input; and output power in the first battery to the external electronic device through the coil, in response to a second user input identified from the UI, based on the at least one parameter being adjusted by the second user input.

Methods according to embodiments described in the claims or specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a RAM and a flash memory, a ROM, an electrically erasable programmable ROM (EEPROM), a magnetic disc storage device, a compact disc-ROM (CD-ROM), DVDs, or other type optical storage devices, or a magnetic cassette. Alternatively, any combination of some or all of the aforementioned memories may form a memory in which the program is stored. Further, a plurality of such memories may be included in the electronic device.

In addition, the programs may be stored in an attachable storage device which may access the electronic device through communication networks such as the Internet, an intranet, an LAN, a wide LAN (WLAN), and a storage area network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   a first battery;
   a coil;
   a communication circuit;
   a display;
   a memory; and
   at least one processor operably coupled to the first battery, the coil, the communication circuit, the display, and the memory,
   wherein the memory comprises multiple instructions configured to cause, while being executed, the at least processor to:
   identify a first user input for activating a function of sharing power in the first battery;
   display a first user interface (UI) indicating that the function has been activated on the display, based on the identification of the first user input;
   identify an external electronic device distinguished from the electronic device by using the communication circuit, while the first UI is displayed;
   display a first visual element indicating information regarding a second battery included in the identified external electronic device on the first UI, based on the identification of the external electronic device; and
   output power in the first battery to the identified external electronic device through the coil, at least partially based on a second user input regarding the first visual element.

2. The electronic device of claim 1, wherein the multiple instructions are further configured to cause, while being executed, the at least one processor to:
   identify information comprising a state of charge (SoC) of the second battery, based on the identification of the external electronic device; and
   display a second visual element regarding the SoC on the first UI, based on the identification of the information comprising the SoC.

3. The electronic device of claim 1, wherein the multiple instructions are further configured to cause, while being executed, the at least one processor to:
   output power in the first battery to the external electronic device through the coil in a state in which the SoC of the second battery is less than or equal to an SoC displayed by the first visual element; and suspend outputting power in the first battery to the external electronic device through the coil in a state in which the SoC of the second battery exceeds the SoC displayed by the first visual element.

4. The electronic device of claim 1, wherein the multiple instructions are further configured to cause, while being executed, the at least one processor to:

identify a change in a state of charge (SoC) of the first battery in a state in which charging of the second battery is completed, based on an SoC displayed by the first visual element, based on the identification of the external electronic device; and display a second visual element indicating the identified change in the SoC on the first UI, based on the identification of the change in the SoC of the first battery.

5. The electronic device of claim 1, wherein the multiple instructions are further configured to cause, while being executed, the at least one processor to:

identify a state of charge (SoC) of the first battery, based on the identification of the first user input;

display the first UI indicating activation of the function, based on the identification of the SoC being greater than or equal to a preset SoC from the first battery; and display a second UI indicating deactivation of the function, based on the identification of the SoC being below the preset SoC from the first battery.

6. The electronic device of claim 1, wherein the multiple instructions are further configured to cause, while being executed, the at least one processor to limit activation of the function of sharing power and display of the first UI in a state in which a current for charging the first battery is received wirelessly.

7. The electronic device of claim 1, further comprising a sensor configured to measure luminance of light directed to a first surface of a housing of the electronic device, wherein the multiple instructions are further configured to cause, while being executed, the at least one processor to:

measure a first luminance corresponding to a timepoint of the identification of the first user input based on the sensor;

identify the external electronic device by using the communication circuit for a preset time after the identification of the first user input;

measure a second luminance corresponding to a timepoint distinguished from the first luminance based on the sensor, based on identifying that the external electronic device has not been connected through the communication circuit for the preset time; and deactivate the function of sharing power in the first battery, at least partially based on a difference between the first luminance and the second luminance.

8. The electronic device of claim 1, further comprising a sensor configured to measure a movement of the electronic device, wherein the multiple instructions are further configured to cause, while being executed, the at least one processor to:

measure the movement of the electronic device by using the sensor, after identification of the first user input; and deactivate the function of sharing power in the first battery, at least partially based on whether or not the movement of the electronic device has been measured after the identification of the first user input.

9. The electronic device of claim 1, further comprising at least one sensor, wherein the memory is further configured to store multiple instructions configured to cause, while being executed, the at least one processor to:

measure a first luminance of light directed to the at least one sensor in response to activation of the function based on the identified first user input;

identify a connection between the electronic device and an external electronic device for receiving power in the first battery for a preset time after activation of the function;

measure a second luminance of light directed to the at least one sensor in response to identifying that the connection is not established in the present time; and deactivate the function of sharing power in the first battery, at least partially based on the first luminance and the second luminance.

10. The electronic device of claim 9, wherein the multiple instructions are further configured to cause, while being executed, the at least one processor to:

identify a connection between the external electronic device and the electronic device by maintaining activation of the function in response to identifying that the second luminance is lower than the first luminance; and deactivate the function by suspending identification of the connection between the external electronic device and the electronic device in response to identifying a difference between the first luminance and the second luminance within a preset range.

11. The electronic device of claim 9, wherein the multiple instructions are further configured to cause, while being executed, the at least one processor to:

identify a state of charge (SoC) of the first battery, based on the identification of the first user input; and display a message requesting charging of the first battery to a user, based on the identification of the SoC being lower than a preset SoC.

12. The electronic device of claim 9, further comprising a communication circuit, wherein the multiple instructions are further configured to cause, while being executed, the at least one processor to:

identify a state of charge (SoC) of a second battery included in the external electronic device in response to identifying the connection between the external electronic device and the electronic device established by using the communication circuit within the preset time; and output power in the first battery to the external electronic device through the coil, based on the SoC of the second battery and at least one parameter associated with the function that has been input by a user.

13. The electronic device of claim 12, wherein the multiple instructions are further configured to cause, while being executed, the at least one processor to:

output power in the first battery to the external electronic device through the coil in a state in which the SoC of the second battery is less than or equal to a target SoC input by the user; and limit output of power in the first battery through the coil in a state in which the SoC of the second battery exceeds the target SoC.

14. The electronic device of claim 12, wherein the multiple instructions are further configured to cause, while being executed, the at least one processor to:

identify whether or not a function of sharing power in the second battery has been activated by the external electronic device in response to identifying the connection between the external electronic device and the electronic device established by using the communication circuit within the preset time;

request the external electronic device to deactivate the function of sharing power in the second battery by using the communication circuit in response to identifying that the function of sharing power in the second battery has been activated by the external electronic device; and initiate output of power in the first battery to the external electronic device through the coil in response to identifying deactivation of the function of sharing power in the second battery by the external electronic device.

15. The electronic device of claim 9 wherein the at least one sensor comprises a luminance sensor disposed on a first surface of a housing of the electronic device, on which the display is disposed, so as to measure luminance of light directed to the first surface, and the multiple instructions are further configured to cause, while being executed, the at least one processor to measure the first luminance and the second luminance by using the luminance sensor.

16. The electronic device of claim 1, further comprising at least one sensor, wherein the memory is further configured to store multiple instructions configured to cause, while being executed, the at least processor to:

identify a connection between the electronic device and an external electronic device for receiving power in the first battery for a preset time in response to activation of the function based on the identified first user input;

acquire data regarding a movement of the electronic device measured by using the at least one sensor for the preset time;

identify the movement of the electronic device measured within the present time based on the data in response to identifying that the connection is not established in the preset time; and deactivate the function of sharing power in the first battery in response to identifying the movement of the electronic device measured within the preset time.

17. The electronic device of claim 16, wherein the multiple instructions are further configured to cause, while being executed, the at least one processor to identify the connection between the external electronic device and the electronic device by maintaining activation of the function in response to identifying, from the data, that the electronic device has not moved within the preset time.

18. The electronic device of claim 16, further comprising a communication circuit, wherein the multiple instructions are further configured to cause, while being executed, the at least one processor to:

identify a state of charge (SoC) of a second battery included in the external electronic device in response to identifying the connection between the external electronic device and the electronic device established by using the communication circuit within the preset time; and output power in the first battery to the external electronic device through the coil, based on the SoC of the second battery and at least one parameter associated with the function that has been input by a user.

19. The electronic device of claim 18, wherein the multiple instructions are further configured to cause, while being executed, the at least one processor to:

output power in the first battery to the external electronic device through the coil in a state in which the SoC of the second battery is less than or equal to a target SoC input by the user; and limit output of power in the first battery in a state in which the SoC of the second battery exceeds the target SoC.

20. The electronic device of claim 18, wherein the multiple instructions are further configured to cause, while being executed, the at least one processor to:

display a user interface (UI) associated with the at least one parameter in response to activation of the function based on the identified first user input; and output power in the first battery to the external electronic device through the coil, in response to a second user input identified from the UI, based on the at least one parameter being adjusted by the second user input.

* * * * *